United States Patent
Tsai

(10) Patent No.: US 11,548,592 B2
(45) Date of Patent: Jan. 10, 2023

(54) BICYCLE TRANSMISSION DEVICE

(71) Applicant: TIEN HSIN INDUSTRIES CO., LTD., Taichung (TW)

(72) Inventor: Vince Tsai, Taichung (TW)

(73) Assignee: Tien Hsin Industries Co., Ltd., Taichung (TW)

( * ) Notice: Subject to any disclaimer, the term of this patent is extended or adjusted under 35 U.S.C. 154(b) by 395 days.

(21) Appl. No.: 16/861,672

(22) Filed: Apr. 29, 2020

(65) Prior Publication Data
US 2021/0339825 A1    Nov. 4, 2021

(51) Int. Cl.
| | | |
|---|---|---|
| *B62M 9/10* | (2006.01) | |
| *B60B 27/04* | (2006.01) | |
| *F16D 1/08* | (2006.01) | |
| *B60B 27/02* | (2006.01) | |
| *F16D 1/10* | (2006.01) | |

(52) U.S. Cl.
CPC ............. *B62M 9/10* (2013.01); *B60B 27/023* (2013.01); *B60B 27/04* (2013.01); *F16D 1/0847* (2013.01); *F16D 2001/103* (2013.01)

(58) Field of Classification Search
CPC ........ B62M 9/10; B60B 27/023; B60B 27/04; F16D 1/0847; F16D 2001/103
USPC ................................................ 474/160, 158
See application file for complete search history.

(56) References Cited

U.S. PATENT DOCUMENTS

| | | | |
|---|---|---|---|
| 9,771,127 B2 | 9/2017 | Braedt | |
| 2016/0083045 A1* | 3/2016 | Lin | ......................... F16H 55/30 474/160 |
| 2017/0361650 A1* | 12/2017 | Shen | ..................... B60B 27/023 |
| 2019/0054765 A1* | 2/2019 | Thrash | .................. B60B 27/047 |

* cited by examiner

*Primary Examiner* — Gene O Crawford
*Assistant Examiner* — Emily R Kincaid
(74) *Attorney, Agent, or Firm* — Apex Juris, PLLC; Hilde Coeckx; Tracy Heims

(57) ABSTRACT

A bicycle transmission device for connecting to a freehub body on a rear wheel, which has convex keys arranged radially on the periphery. The bicycle transmission device includes a connecting member, a fastener, and a cogset assembly. The connecting member includes a cylindrical body portion, connection keys protruding from a periphery of the body portion, a cut groove passing through the body portion, and first and second connecting seats located on two sides of the cut groove. The inner wall of the body portion has concave grooves corresponding to the convex keys. The fastener is adapted to be connected to the connecting seats and to pull them together. The cogset assembly includes a cogset seat and sprockets. The cogset seat has a first socket hole fitting around the connecting member and connection grooves corresponding to and adapted to be connected to the connection keys. The sprockets with different numbers of chain teeth are adapted to be connected to the cogset seat.

8 Claims, 25 Drawing Sheets

BICYCLE TRANSMISSION DEVICE

BACKGROUND OF THE INVENTION

Technical Field

The present disclosure relates generally to bicycles, and more particularly to a bicycle transmission device.

Description of Related Art

With the popularity of bicycles, bicycle transmission devices have become more diverse in structural design. In conventional bicycle transmission devices, such as disclosed in the specification and in FIG. 10 of U.S. Pat. No. 9,771,127, the connecting member installed on the rear wheel has external screw threads, while the adapter has internal screw threads corresponding to the external screw threads, so that the adapter can be screwed onto the connecting member and the sprocket is fixed on the outside of the adapter. Thus, when the chain drives the sprocket to turn, the turning force of the sprocket will be transmitted to the adapter, and then to the connecting member through the screw threads, which cause the rear wheel to rotate.

However, said turning force is transmitted through the matching screw threads between the adapter and the connecting member. Therefore, if a user applies an excessive pedaling force instantly (e.g., when out-of-saddle sprinting or when climbing a hill), the screw threads could be stripped, which may cause the wheel to slip, making the user take an infirm step and putting the user at risk.

Moreover, in U.S. Pat. No. 9,771,127, to prevent the sprocket from coming loose, the outer periphery of the adapter has a flange so that its outer diameter is greater than the inner diameter of the center hole of the sprocket. Thus, when the adapter is installed on the sprocket, the outer flange of the adapter abuts against the sprocket for fixing. However, during assembly with the above-mentioned structure, the sprocket has to be installed on the adapter first, and the adapter with the sprocket is then installed to the connecting member. Afterward, a user has to rotate the sprocket and the adapter at the same time to screw the adapter to the connecting member. Therefore, the assembly process is complicated and difficult.

Furthermore, to reduce the risks of the device described in U.S. Pat. No. 9,771,127, other applicants have applied for U.S. Patent Publication No. 2019/0054765. The specification and FIG. 6 of Publication No. 2019/0054765 describe a device wherein a groove is provided around the center hole of the base seat of the big chain, and the sprocket has a screw hole. During assembly, first two forces are exerted on two opposite sides of the groove so that the big sprocket can be fixed on the connecting member by pressing the base seat. Thereafter, the small sprocket is connected to the base seat on the big sprocket, wherein the small sprocket has a perforation corresponding to the screw hole of the big sprocket. Finally, the small sprocket is screwed to the big sprocket by the small bolt passing through the perforation and locking into the screw hole. Thus, the small bolt abuts against the small sprocket to prevent the small sprocket from coming loose.

With the structure described in Patent Publication No. 2019/0054765, when the chain drives the big sprocket or the small sprocket to turn, the turning force is transmitted through the big sprocket or the small sprocket from the base seat of the big sprocket to the connecting member, and further drives the rear wheel to rotate. Therefore, force transmission by the screw threads could be avoided to prevent the screw threads from being stripped, which may happen in aforementioned U.S. Pat. No. 9,771,127.

However, the small sprocket is fixed to the big sprocket only through the small bolt in U.S. Patent Publication No. 2019/0054765. In practice, when riding the bicycle, continuous vibrations may be generated. Moreover, if a user applies instantly an excessive pedaling force to the small sprocket, the small sprocket could be deformed and a shear force which causes mutual displacement of the big and the small sprockets could be generated, wherein the shear force would also be applied to the small bolt. In such case, after a period of riding or high strength riding, the small bolt could come loose due to continuous vibrations or due to shear forces, which creates safety concerns.

BRIEF SUMMARY OF THE INVENTION

In view of the above, the primary objective of the present disclosure is to provide a bicycle transmission device which improves the prior art device. The bicycle transmission device of the present disclosure is more secure and is stronger than existing devices, and is easily detachable and maintainable.

The present disclosure provides a bicycle transmission device for connecting to a freehub body of a bicycle, wherein the freehub body is coaxially connected to a rear wheel of the bicycle. The freehub body has a peripheral part and a plurality of convex keys extending along a radial direction of the peripheral part. The bicycle transmission device includes a connecting member and a fastener in the form of a bolt, wherein the connecting member includes a cylindrical body portion which has a first end and a second end, a plurality of connection keys protruding from an outer periphery of the body portion, a cut groove passing through an inner and outer walls of the body portion and extending from the second end to the first end, and a first connecting seat and a second connecting seat respectively located on two sides of the cut groove. The connecting member has a plurality of concave grooves formed on the inner wall of the body portion. The concave grooves of the connecting member correspond to the plurality of convex keys for exerting a force on the first connecting seat and the second connecting seat, which pulls the two connecting seats close to each other.

The body portion of the connecting member fits on the freehub body to engage the concave grooves with the convex keys of the freehub body. Moreover, the force exerted by the fastener on the first connecting seat and the second connecting seat pulls the first connecting seat and the second connecting seats close to each other to fix the connecting member to the freehub body, and to install the bicycle transmission device on the freehub body.

The bicycle transmission device further includes a cogset assembly which includes a cogset seat and at least two sprockets. The cogset seat has a first socket hole adapted to fit around the connecting member. The cogset seat further has a plurality of connection grooves corresponding to and connected to the connection keys. The at least two sprockets have different number of chain teeth respectively, and are coaxially connected to the cogset seat.

The connecting member has an internal thread section on the inner wall at the first end of the body portion. The bicycle transmission device further includes an affiliated sprocket and a locking ring, wherein the affiliated sprocket includes a chain teeth portion consisting of a predetermined number of chain teeth, which is provided on an outer periphery in a radial direction of the affiliated sprocket. The affiliated sprocket has a second socket hole on an inner periphery in the radial direction of the affiliated sprocket for fitting around the connecting member. The locking ring includes a main body segment and a flange segment, wherein an outer diameter of the flange segment is greater than an outer diameter of the main body segment. The main body segment has an external thread section corresponding to and engaged with the internal thread section, so that the flange segment presses on the affiliated sprocket, and then the affiliated sprocket presses one of the at least two sprockets of the cogset assembly.

The cogset seat includes an accessory mounting seat protruding from the first end close to a periphery of the first socket hole. The accessory mounting seat includes at least one accessory mounting key protruding in a radial direction of the accessory mounting seat. The affiliated sprocket has at least one accessory mounting groove formed on an inner wall of the second socket hole corresponding to and engaged with the at least an accessory mounting key.

The first connecting seat has a perforation, and the second connecting seat has a screw hole which is coaxial to the perforation. The fastener passes through the perforation and is engaged with the screw hole. Screwing the bolt exerts a force on the first connecting seat and the second connecting seat, which pulls the first connecting seat and the second connecting seat close to each other.

The connection keys of the connecting member and the concave grooves are located in the same radial plane.

The connection grooves of the cogset seat, the connection keys of the connecting member, and the concave grooves of the connecting member are located in the same radial plane where the convex keys of the freehub body are located in.

A terminal in an axial direction of the cut groove of the connecting member has a curved opening, and a diameter of the curved opening is greater than a width of the cut groove.

The cogset seat further has a receiving groove adapted to receive the first connecting seat, the second connecting seat, and the fastener of the connecting member.

The cogset seat includes a plurality of mounting arms which are radially arranged around the first socket hole. Each of the mounting arms has at least one stage in an axial direction, which correspondingly forms at least two mounting surfaces arranged along the axial direction. The at least two sprockets are engaged with the at least two mounting surfaces respectively.

The body portion of the connecting member has a recess recessed into the second end at a position adjacent to the first connecting seat. The fastener includes a body and a head, wherein the body passes through the perforation and is engaged with the screw hole. An outer diameter of the head is greater than an outer diameter of the body, and the head presses on the first connecting seat and is located in the recess.

The force transmission pathway of the abovementioned structures avoids the risk of stripped screw threads. The structure cannot easily come loose, thereby providing a more secure and stronger device. Moreover, the structures described in the present disclosure are easy to detach, assemble, and repair.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
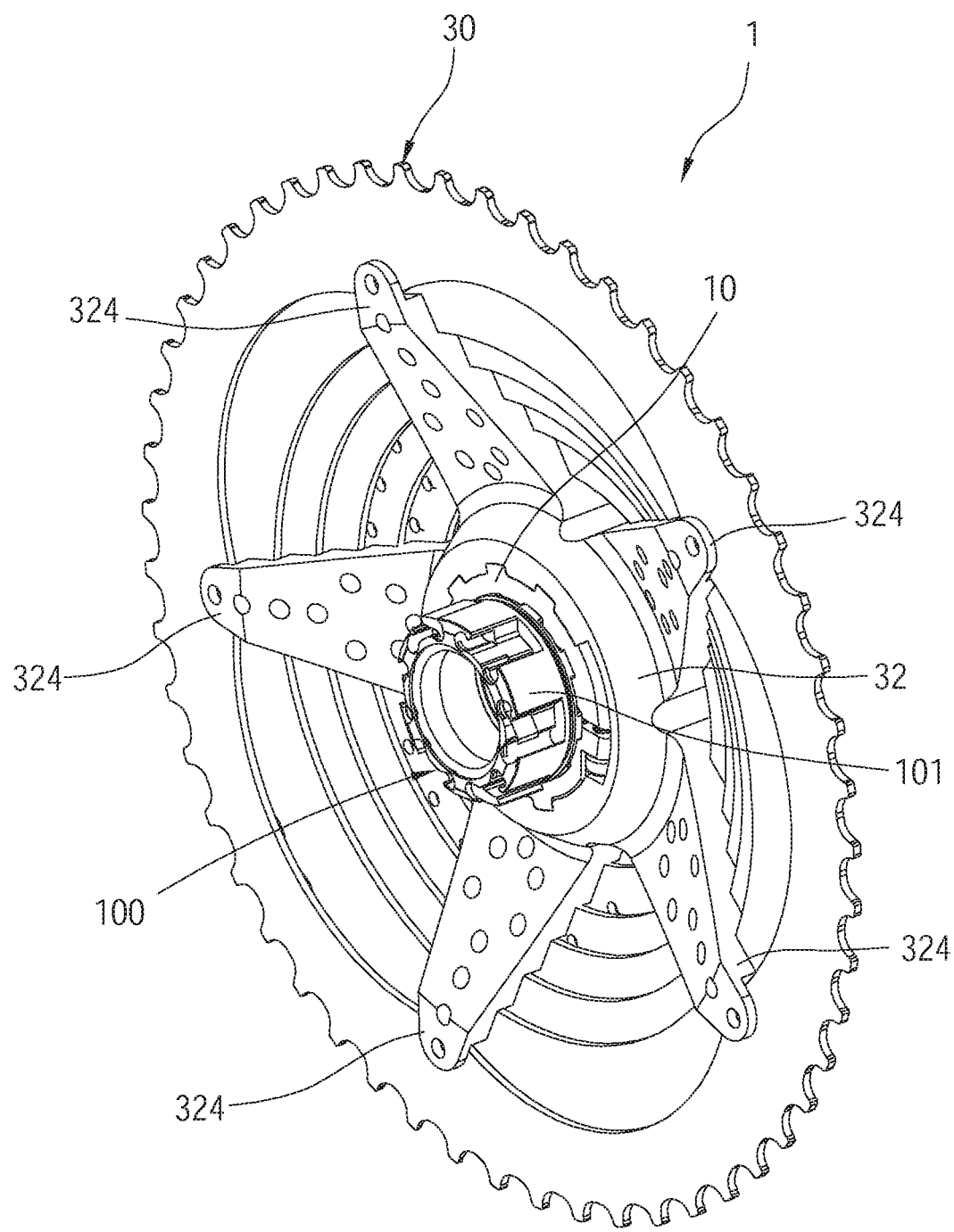
FIG. 1 is a perspective view of the bicycle transmission device of an embodiment of the present disclosure.
Figure 2:
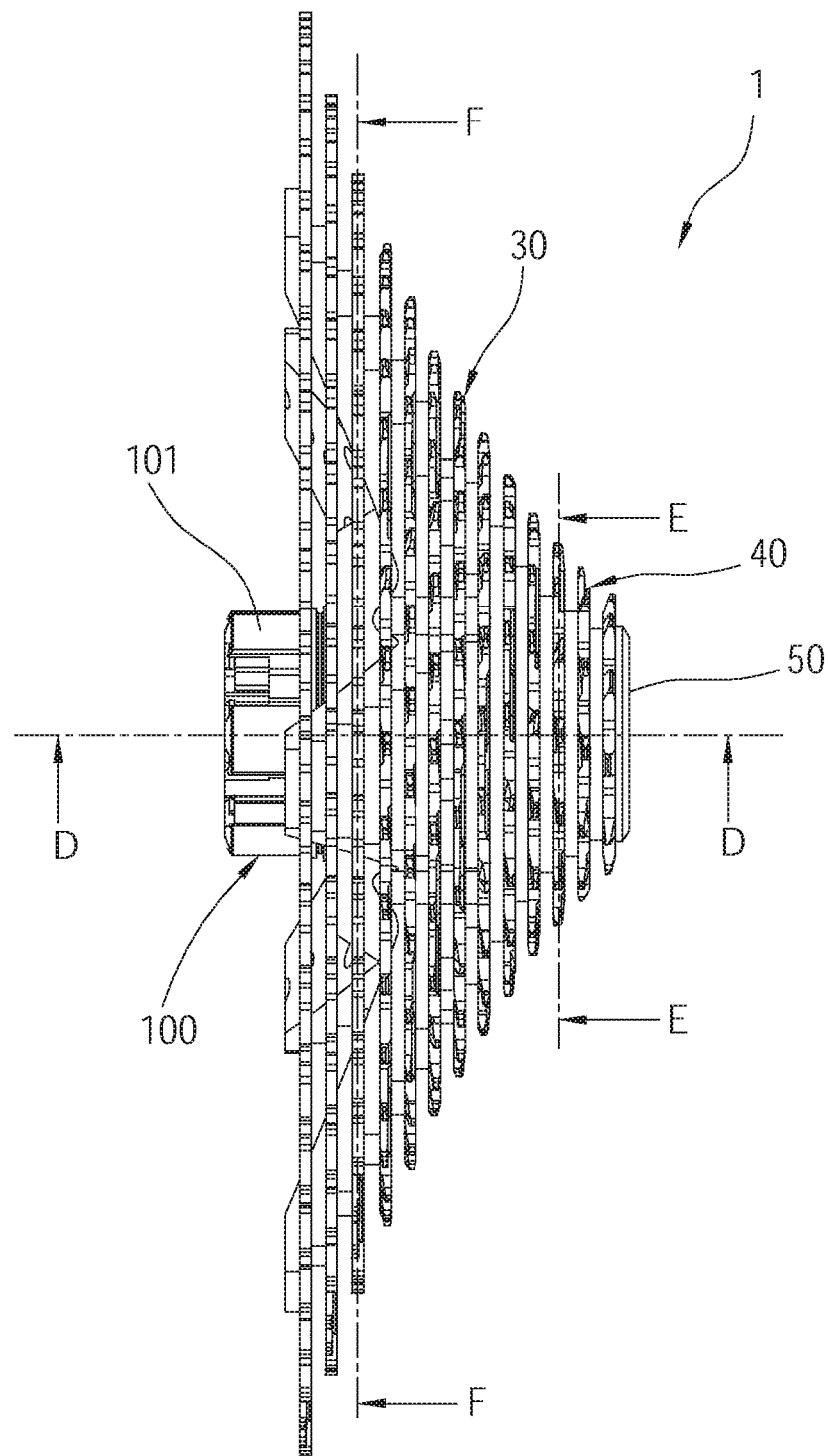
FIG. 2 is a lateral view of FIG. 1.
Figure 3:
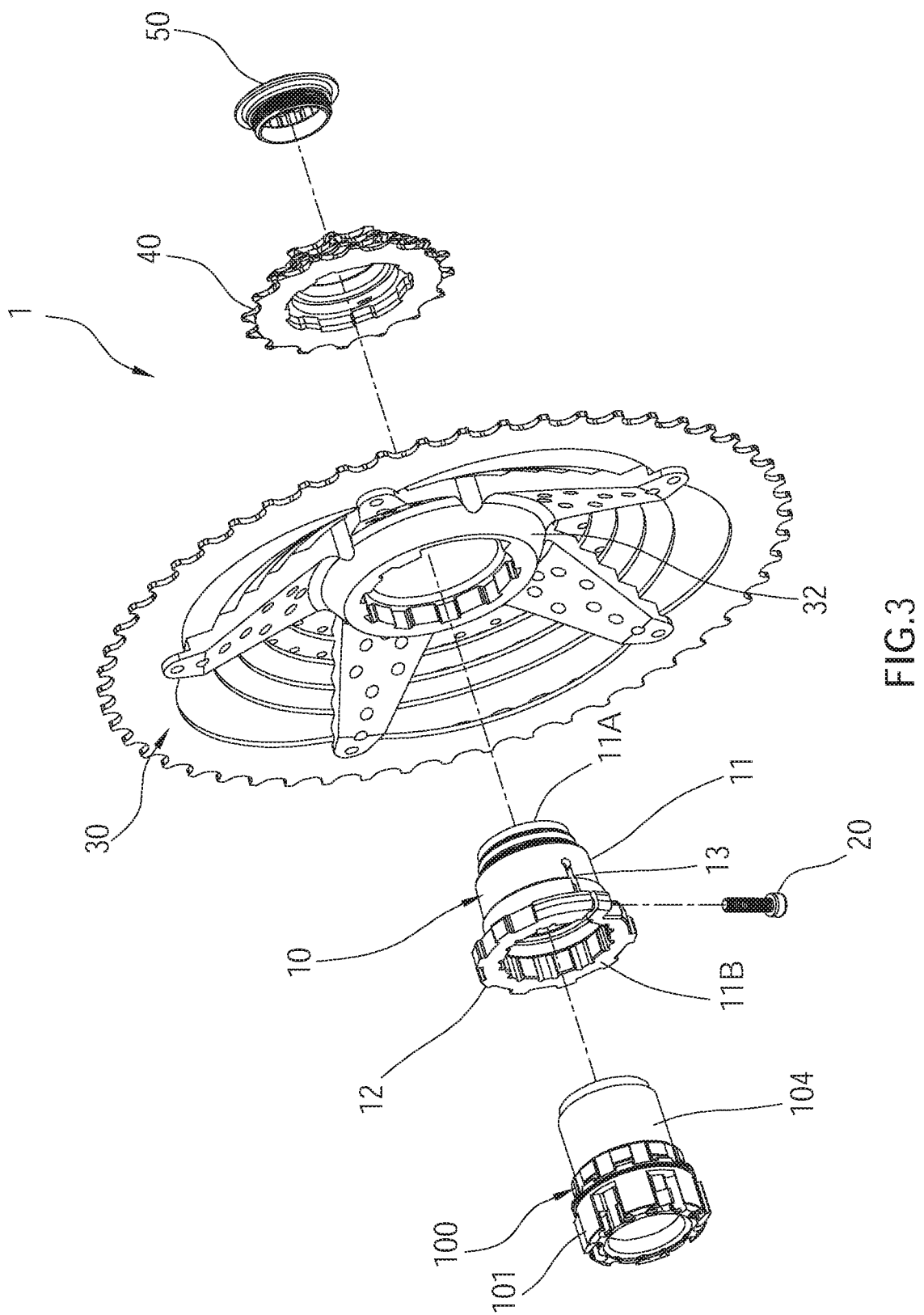
FIG. 3 is an exploded view of FIG. 1.
Figure 4:
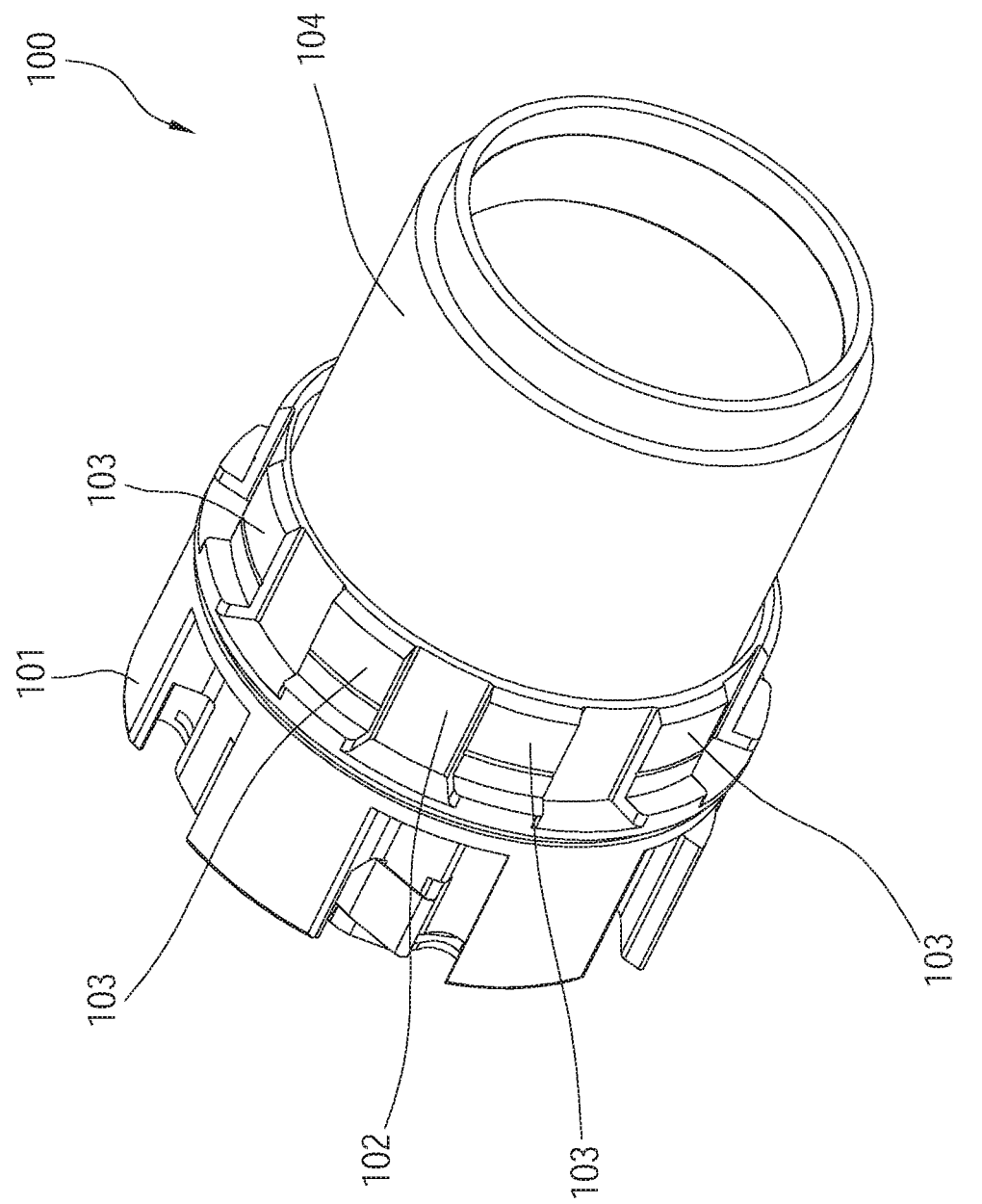
FIG. 4 is a perspective view of the freehub body on which the embodiment of the present disclosure is installed.

A bicycle transmission device 1 according to an embodiment of the present disclosure is illustrated in FIG. 1 to FIG. 3. Bicycle transmission device 1 is adapted to be connected to a freehub body 100. Freehub body 100 is adapted to be coaxially connected to a rear wheel of a bicycle (not shown). A junction of the freehub body 100 and the rear wheel has a joint part 101 which is used as a unidirectional ratchet to be connected to the rear wheel of a bicycle. Furthermore, when the freehub body 100 rotates in a driving direction, it drives the rear wheel to rotate, while when the freehub body 100 rotates in a non-driving direction which is opposite to the driving direction, it will not drive the rear wheel to rotate. The structure of the rear wheel is not described in detail herein because it is not the focus of the present disclosure. In the current embodiment, as shown in FIG. 4, the freehub body 100 has a peripheral part 102 and a plurality of convex keys 103 arranged radially along the peripheral part 102. Additionally, the freehub body 100 includes a base seat 104 which extends in the direction opposite to the joint part 101.

Figure 5:
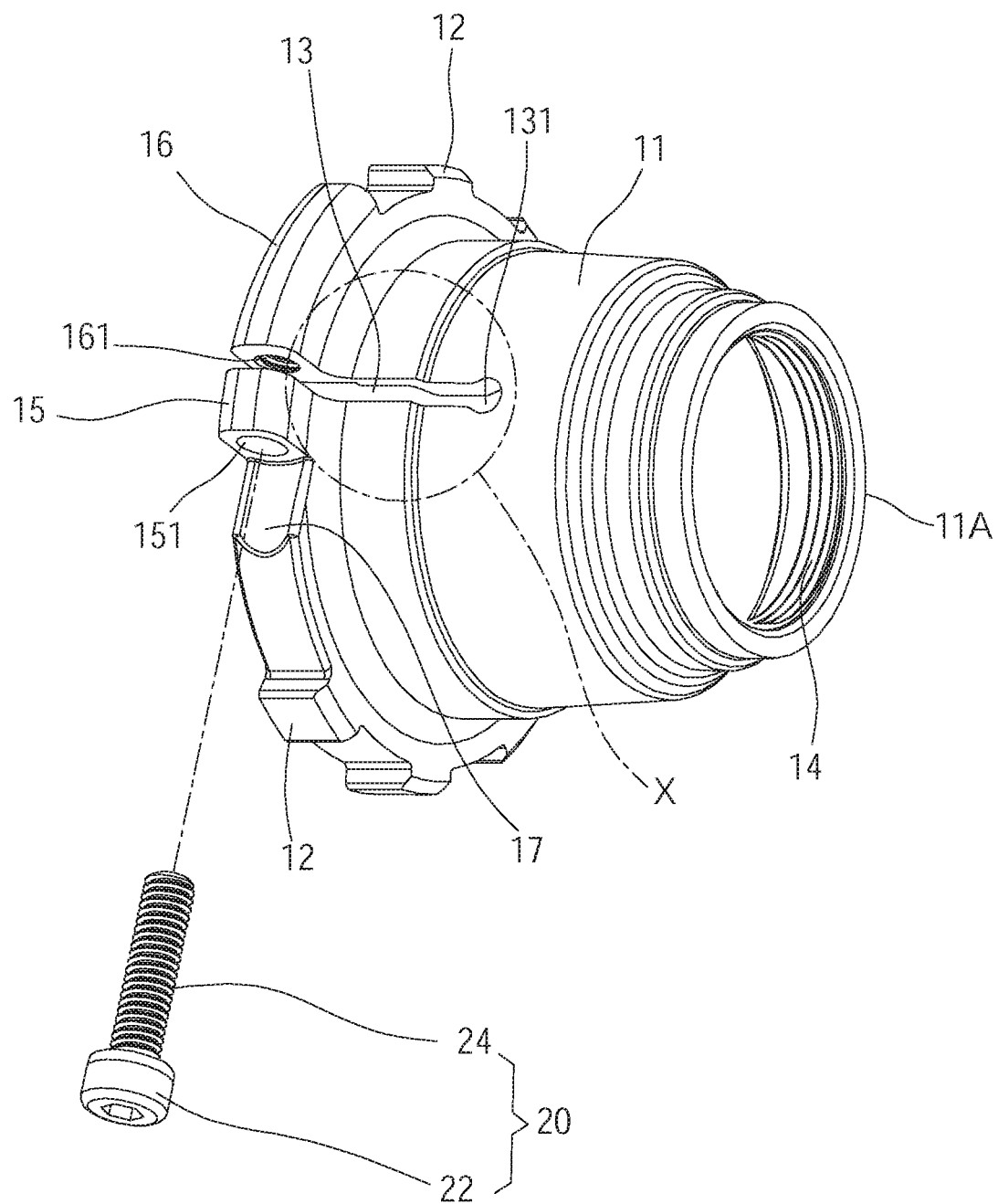
FIG. 5 is a perspective view of the connecting member and the fastener of the embodiment of the present disclosure.
Figure 6:
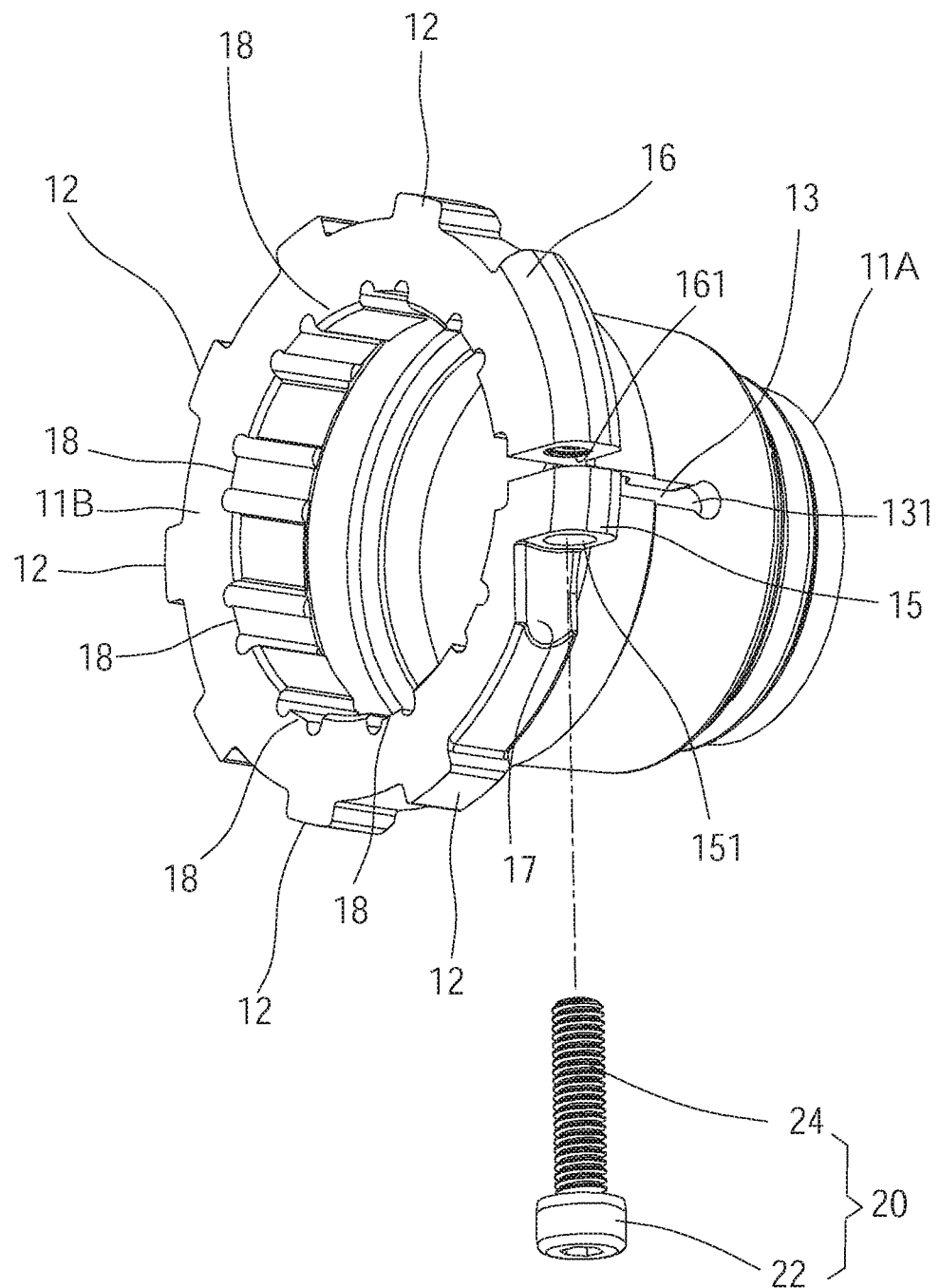
FIG. 6 is another perspective view of the connecting member of the embodiment of the present disclosure.
Figure 7:
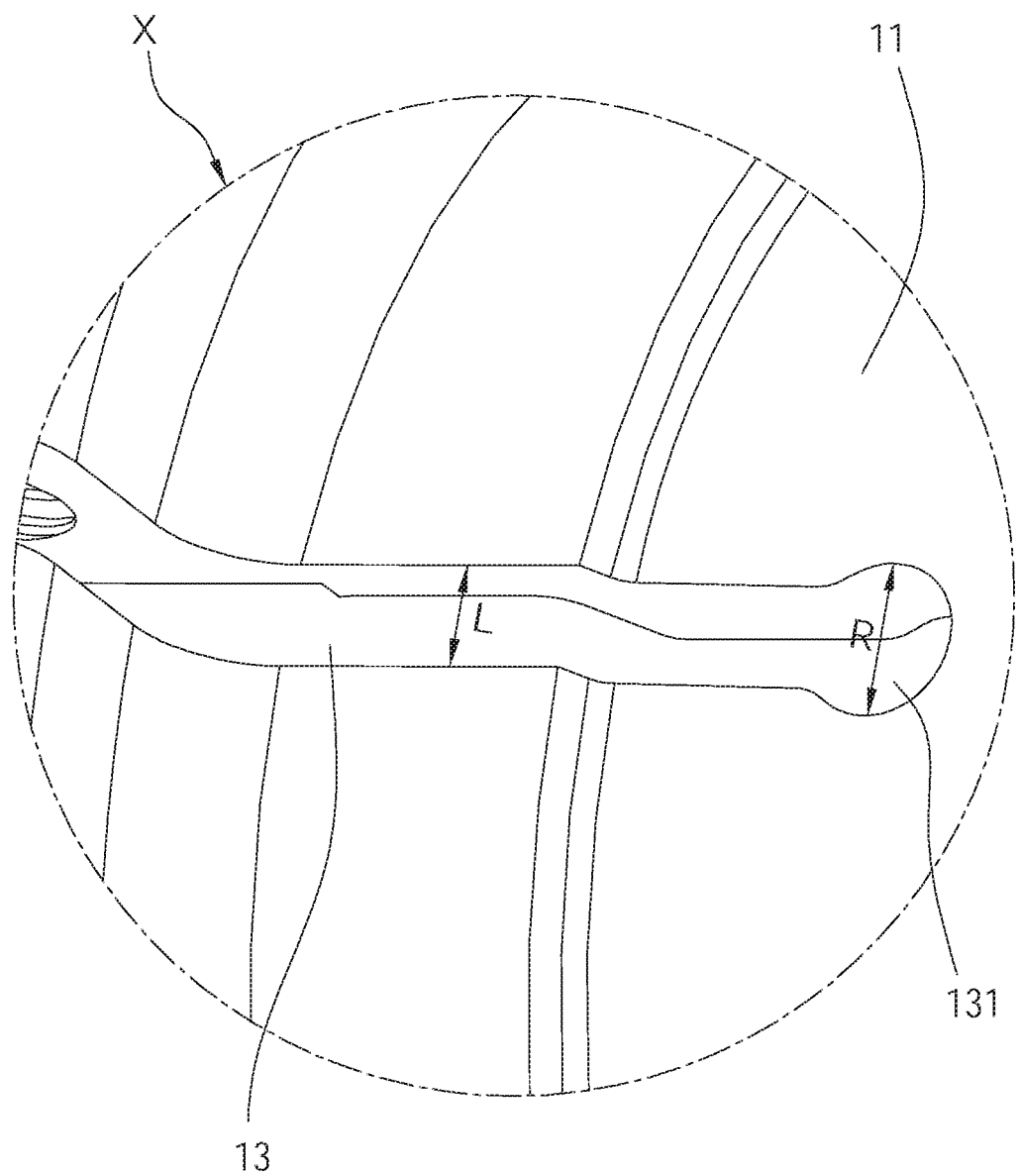
FIG. 7 is an enlarged view of the circle marked X in FIG. 5.

In order to specify the technology of the present disclosure, the structure of each component of the transmission device 1 of the current embodiment is described as follows. As shown in FIG. 1 to FIG. 3, the transmission device 1 includes a connecting member 10, a fastener 20, a cogset assembly 30, an affiliated sprocket 40, and a locking ring 50. As illustrated in FIG. 5 and FIG. 6, the connecting member 10 includes a cylindrical body portion 11 which has a first end 11A and a second end 11B, and a plurality of connection keys 12 which protrude from the outer periphery of the body portion 11. The connecting member 10 has a cut groove 13 which passes through inner and outer walls of the body portion 11. The cut groove 13 extends from the second end 11B to the first end 11A. As depicted in FIG. 7, the terminal of the cut groove 13 has a curved opening 131, and a diameter R of the opening 131 is greater than a width L of the cut groove 13, so as to form a curved cut groove terminal. The connecting member 10 has an internal thread section 14 on the inner wall at the first end 11A of the body portion 11. The connecting member 10 includes a first connecting seat 15 and a second connecting seat 16, which are located at the second end 11B and are respectively provided on two sides of the cut groove 13 in the body portion 11. The first connecting seat 15 has a perforation 151 and the second connecting seat 16 has a screw hole 161 which is disposed corresponding to the perforation 151. Furthermore, the connecting member 10 has a recess 17 which is recessed into the second end 11B at a position adjacent to the first connecting seat 15. The connecting member 10 has a plurality of concave grooves 18 formed on an inner wall of the body portion 11, which correspond to the convex keys 103.

Additionally, for matching the perforation 151 of the first connecting seat 15 and the screw hole 161 of the second connecting seat 16, in this embodiment, the fastener 20 is a bolt having a head 22 and a body 24. The head 22 is located on an end of the body 24, and the outer diameter of the head 22 is greater than the outer diameter of the body 24. The body 24 has screw threads thereon to pass through the perforation 151 and be connected into the screw hole 161. With such design, a user can abut the head 22 closely against the wall of the first connecting seat 15 around the perforation 151 by turning the fastener 20 so as to exert a force on the first and the second connecting seats 15, 16, which pulls two connecting seats 15, 16 close to each other. Additionally, the recess 17 forms a free space for the head 22 to move smoothly forward to the second connecting seat 16 the process of tightening the fastener 20. However, the fastener in the present disclosure is not limited to a bolt. In other embodiments, the fastener can be a C-shaped buckle, a loop, a hook, or other components which can provide a force directly or indirectly to bring the two connecting seats 15, 16 closer.

Figure 8:
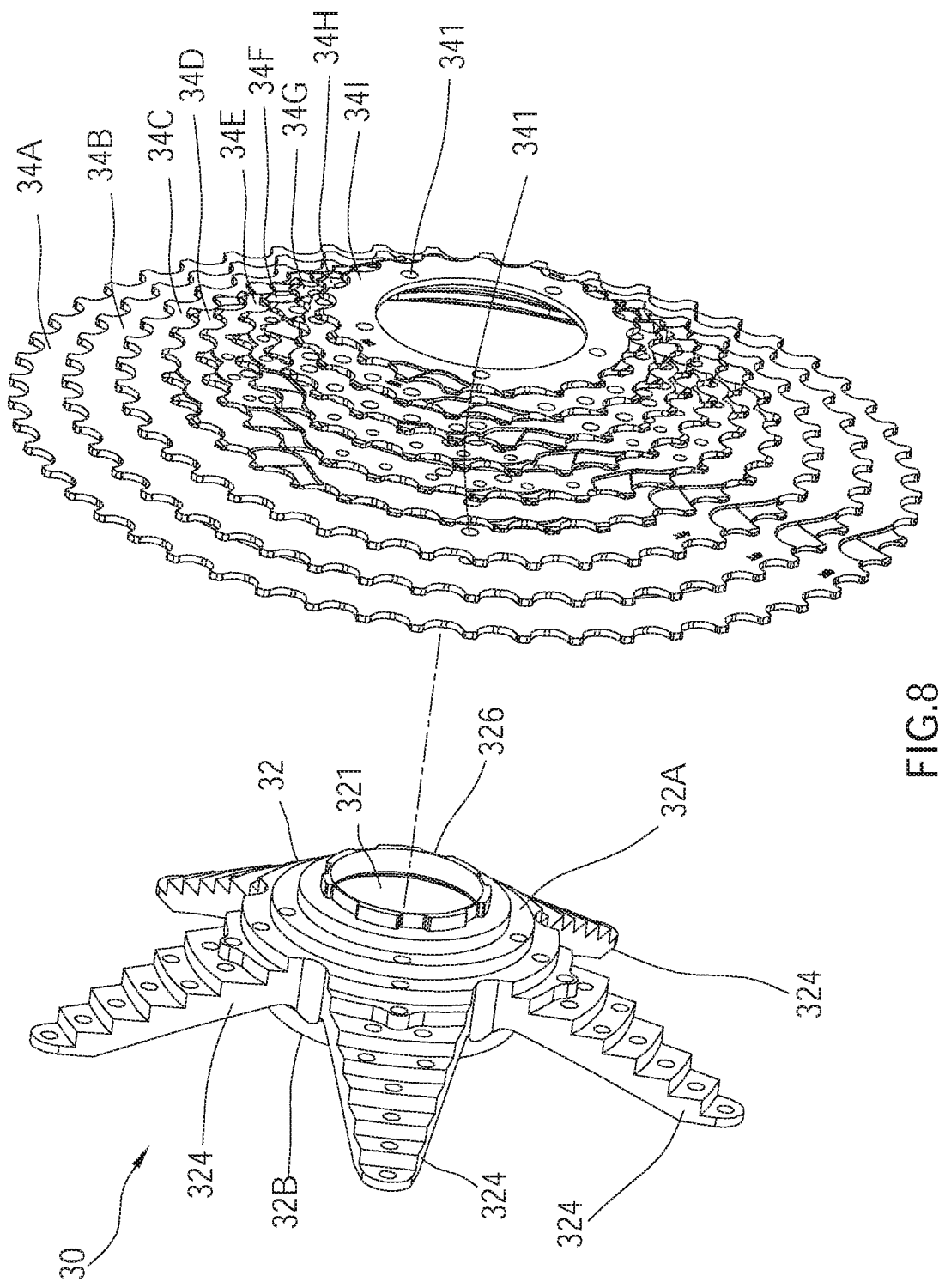
FIG. 8 is an exploded view of the cogset assembly of the embodiment of the present disclosure.
Figure 9:
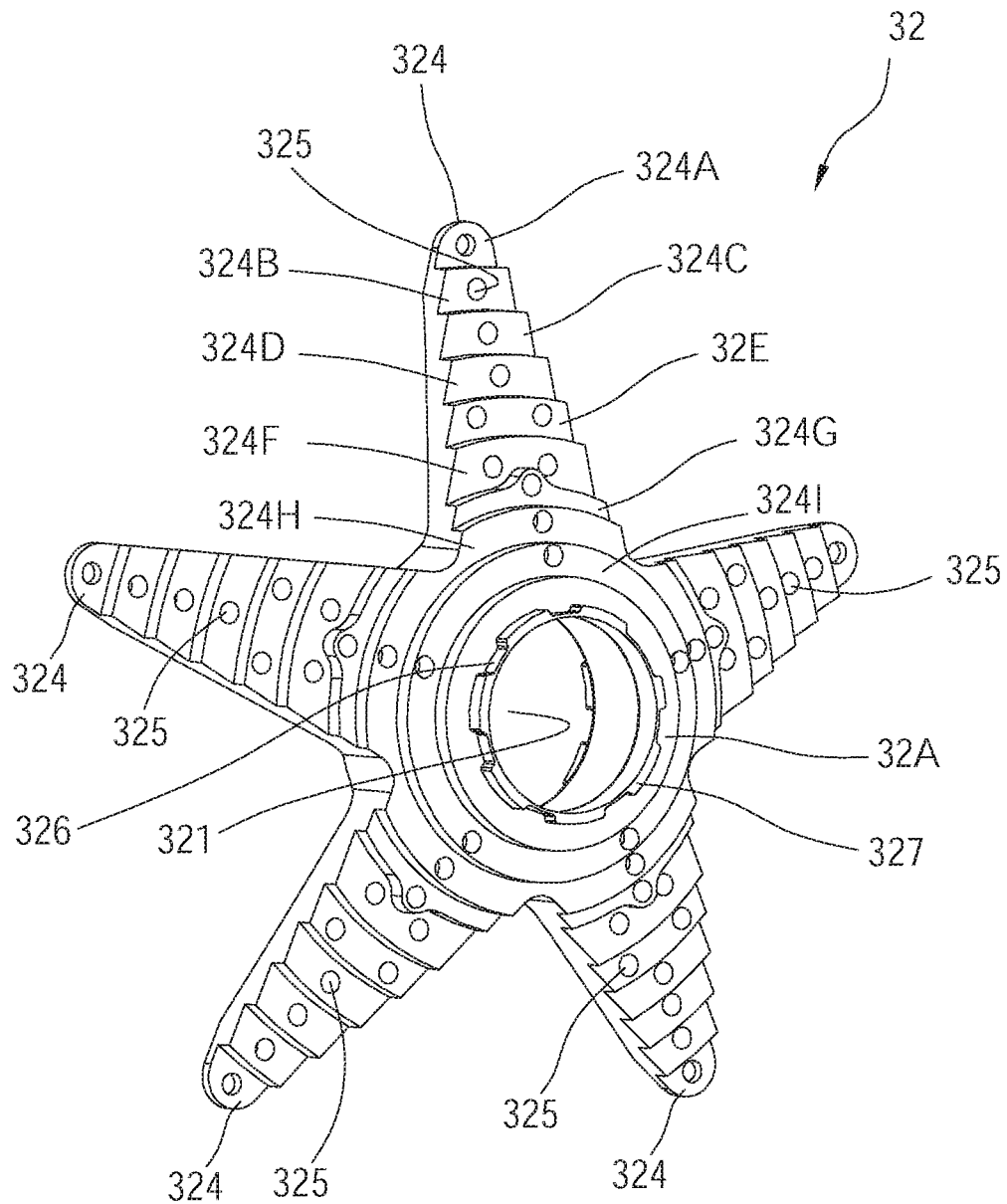
FIG. 9 is a perspective view of the cogset seat of the embodiment of the present disclosure.
Figure 10:
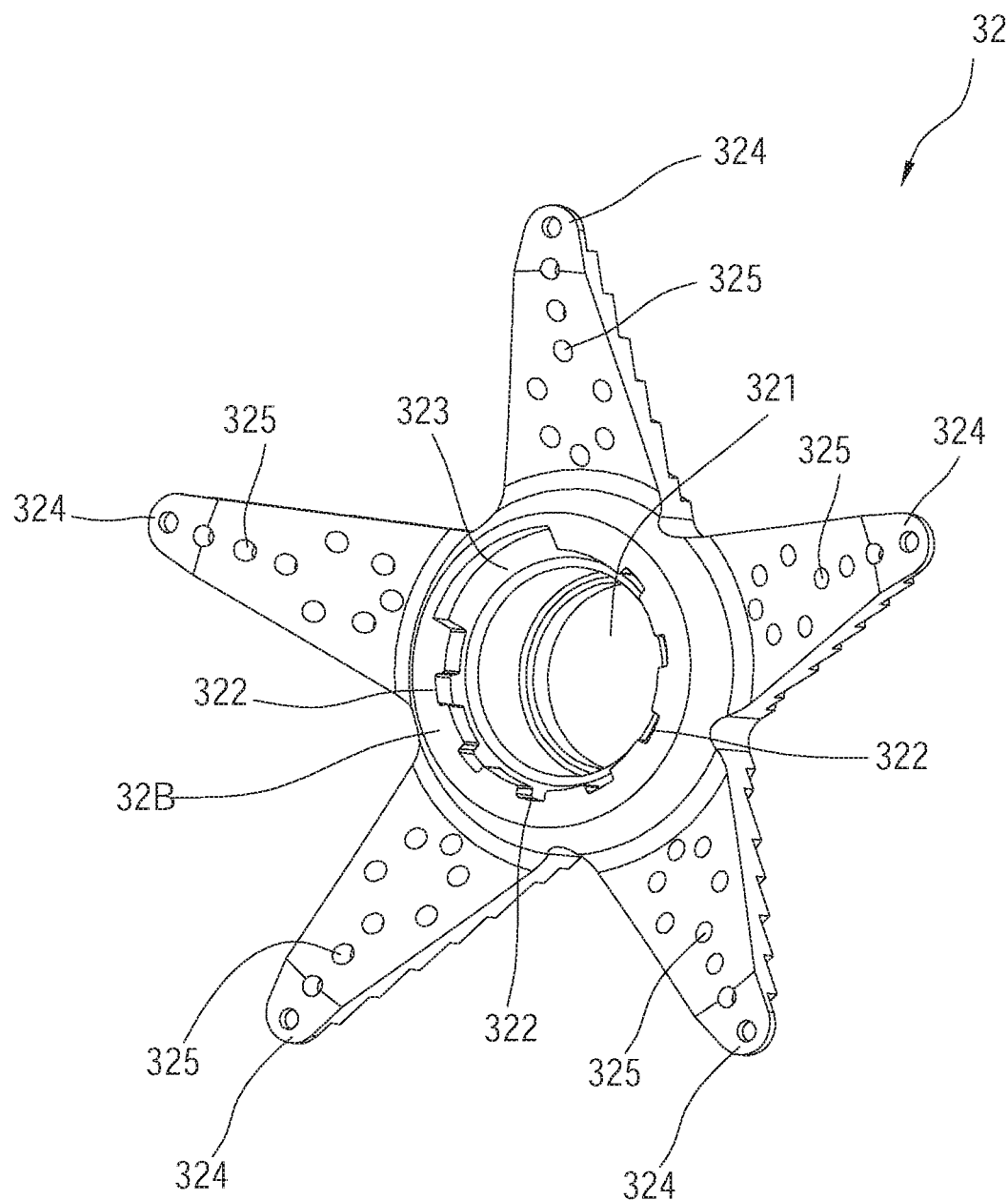
FIG. 10 is another perspective view of the cogset seat of the embodiment of the present disclosure.

As shown in FIG. 8 to FIG. 10, the cogset assembly 30 includes a cogset seat 32 and a plurality of sprockets 34A to 34I. As illustrated in FIG. 9 and FIG. 10, the cogset seat 32 has a first end 32A and a second end 32B. The cogset seat 32 has a first socket hole 321 in the center thereof, which passes through the first end 32A and the second end 32B. The cogset seat 32 further has a plurality of connection grooves 322 formed on the inner wall of the first socket hole 321 closer to the second end 32B than the first end 32A, which are located in the same radial plane and correspond to the aforementioned connection keys. The cogset seat 32 also has a receiving groove 323 formed at a position correspond-ing to the first connecting seat 15 and the second connecting seat 16. In the current embodiment, the cogset seat 32 includes five mounting arms 324 arranged radially around the first socket hole 321. Each of the mounting arms 324 has a plurality of stages from the inside near the first socket hole 321 to the outside away from the first socket hole 321. The stages correspondingly form a plurality of mounting surfaces 324A to 324H facing the first end 32A. Each of the mounting arms 324 has at least one first mounting hole 325 formed in each of the mounting surfaces 324A to 324H and penetrates through the mounting arm 324. In addition, the cogset seat 32 includes an accessory mounting seat 326 protruding from the first end 32A close to the periphery of the first socket hole 321, wherein the accessory mounting seat 326 includes a plurality of accessory mounting keys 327 protruding radially.

As shown in FIG. 8, the sprockets 34A to 34I have respectively different numbers of chain teeth corresponding to different diameters of the sprockets. Moreover, the sprockets 34A to 34I are arranged from the second end 32B to the first end 32A in descending diameters thereof, and are coaxially and correspondingly mounted on the mounting surfaces 324A to 324I of the mounting arms 324 of the cogset seat 32. Each of the sprockets 34A to 34I have at least one second mounting hole 341 corresponding to the at least one first mounting hole 325 for a rivet (not shown) to pass through so that the sprockets 34A to 34I can be fixed on the mounting surfaces 324A to 324I of the mounting arms 324, which achieves the purpose of assembling the cogset assembly 30. In other embodiments, the sprockets can be fixed to the cogset seat by other means instead of rivets, and the structure for assembly and fixing is not limited to the abovementioned mounting arms.

Figure 11:
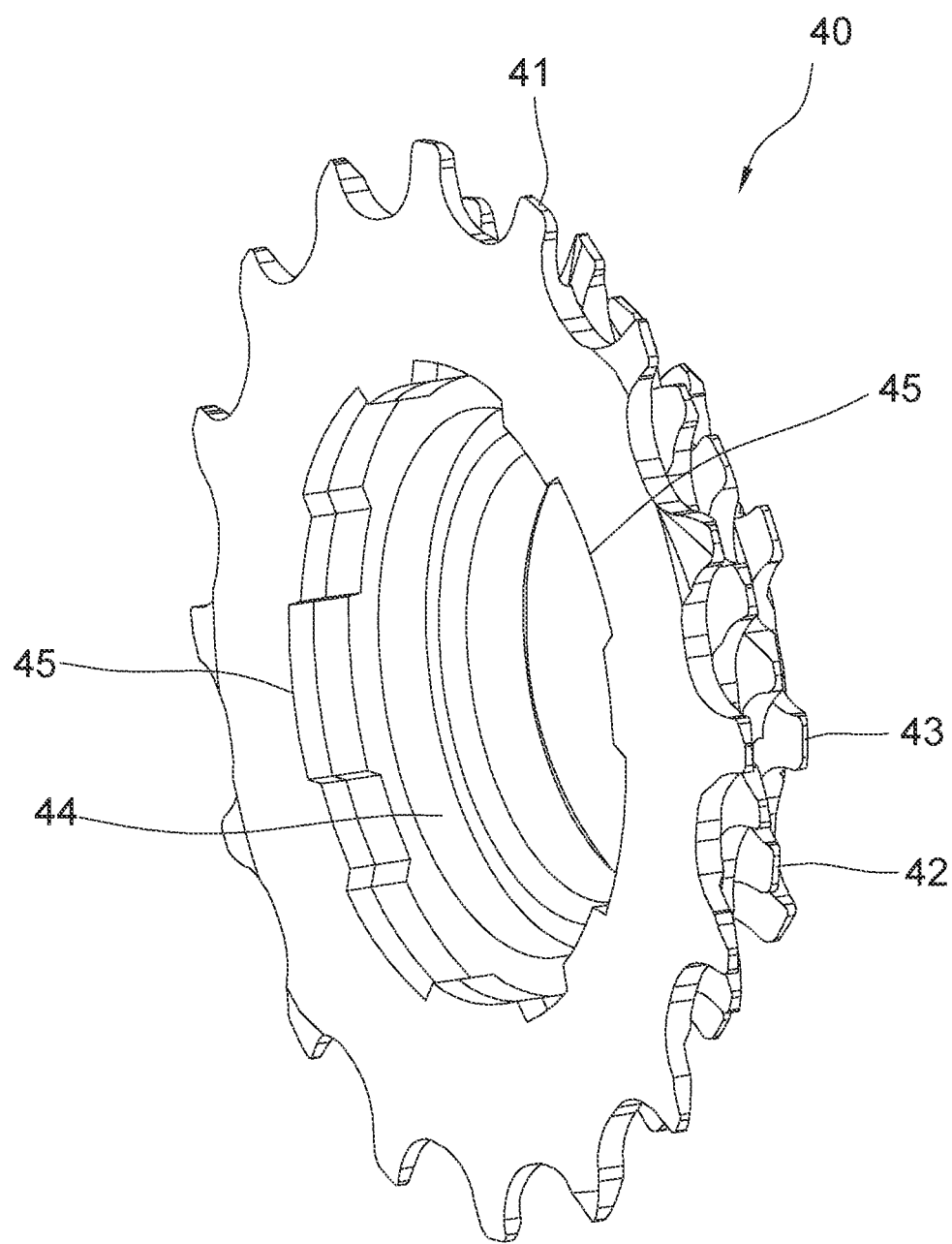
FIG. 11 is a perspective view of the affiliated sprocket of the embodiment of the present disclosure.

As shown in FIG. 11, in the current embodiment, the affiliated sprocket 40 is made as one piece and has three rings of chain teeth portions 41 to 43, wherein each of the chain teeth portions consists of a predetermined number of chain teeth. The number of chain teeth of each ring of chain teeth portions 41 to 43 is different, and the three chain teeth portions 41 to 43 are also sequentially arranged in descending order of chain teeth. The numbers of the chain teeth of the chain teeth portions 41 to 43 of the affiliated sprocket 40 are all less than the number of chain teeth of the sprockets 34A to 34I. Moreover, the affiliated sprocket 40 has a second socket hole 44 in the center thereof, and a plurality of accessory mounting grooves 45 formed on an inner wall of the second socket hole 44, and corresponding to the shapes of the accessory mounting keys 327. In the current embodiment, the affiliated sprocket 40 is integrally formed as a monolithic unit such that it is not easy to break and the physical strength thereof can be effectively maintained. However, the affiliated sprocket in the present disclosure is not limited to be made as one piece; in other embodiment, it can also be an assembled structural design to meet various requirements (such as reducing the costs of maintenance and replacement).

Figure 12:
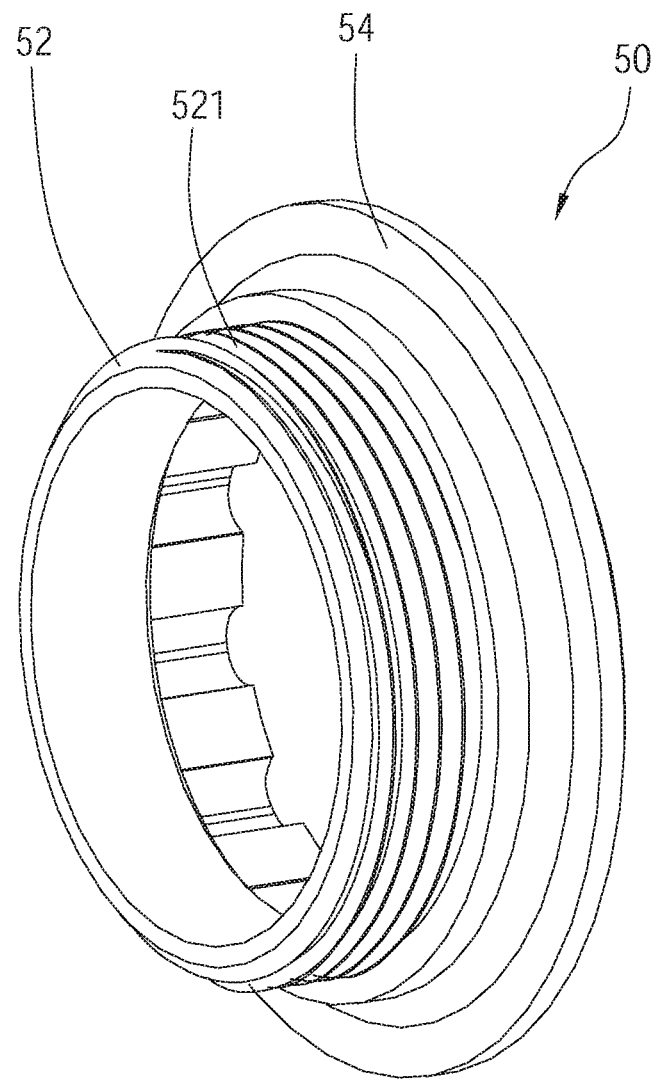
FIG. 12 is a perspective view of the locking ring of the embodiment of the present disclosure.

As shown in FIG. 12, the locking ring 50 has a main body segment 52 and a flange segment 54, wherein the main body segment 52 has an external thread section 521 thereon corresponding to the internal thread section 14. The flange segment 54 is provided at an end of the main body segment 52, and the outer diameter of the flange segment 54 is greater than the outer diameter of the main body segment 52.

Figure 13:
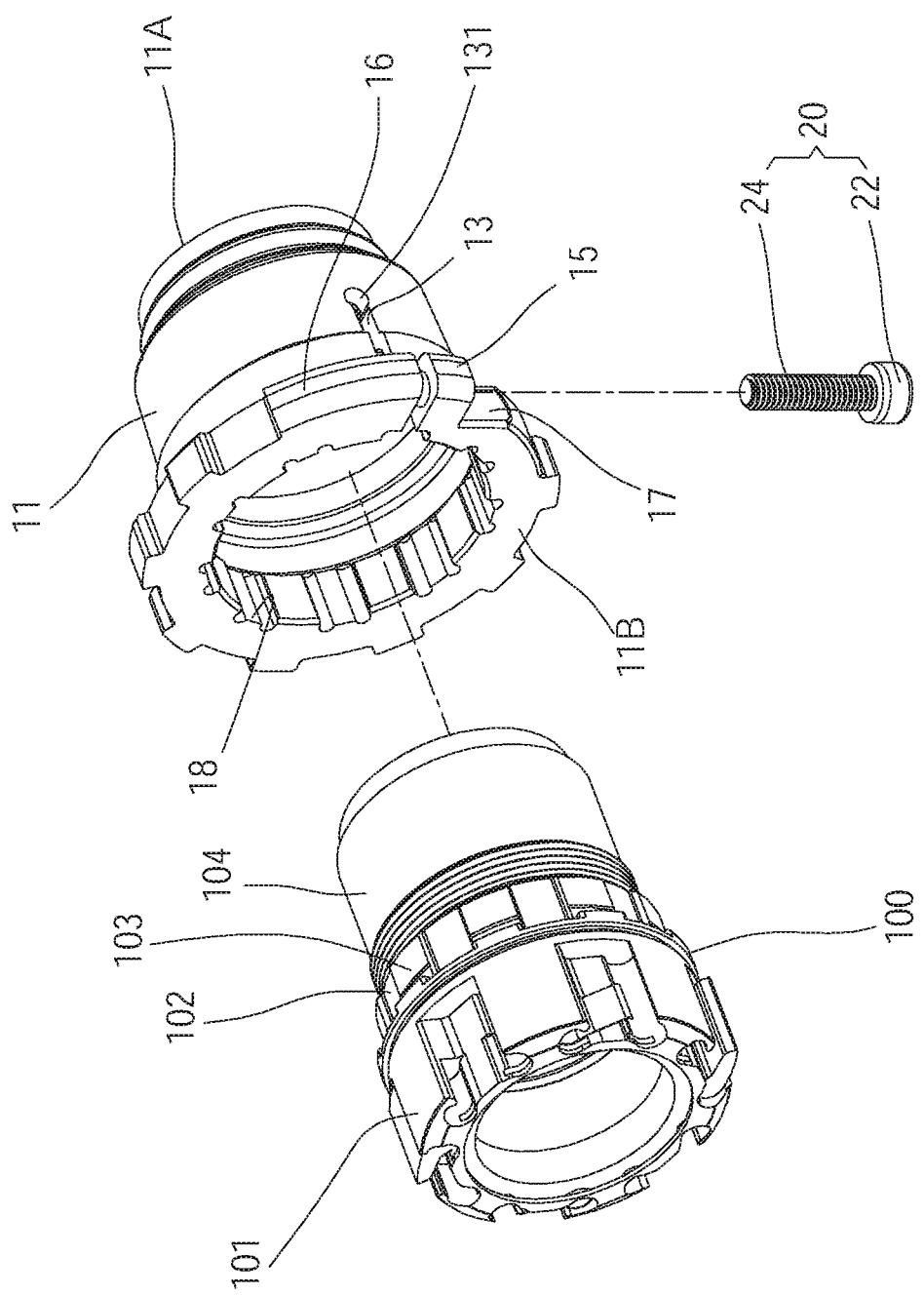
FIG. 13 is a perspective view of the connecting member of the embodiment of the present disclosure and the freehub body, which have not been connected yet.
Figure 14:
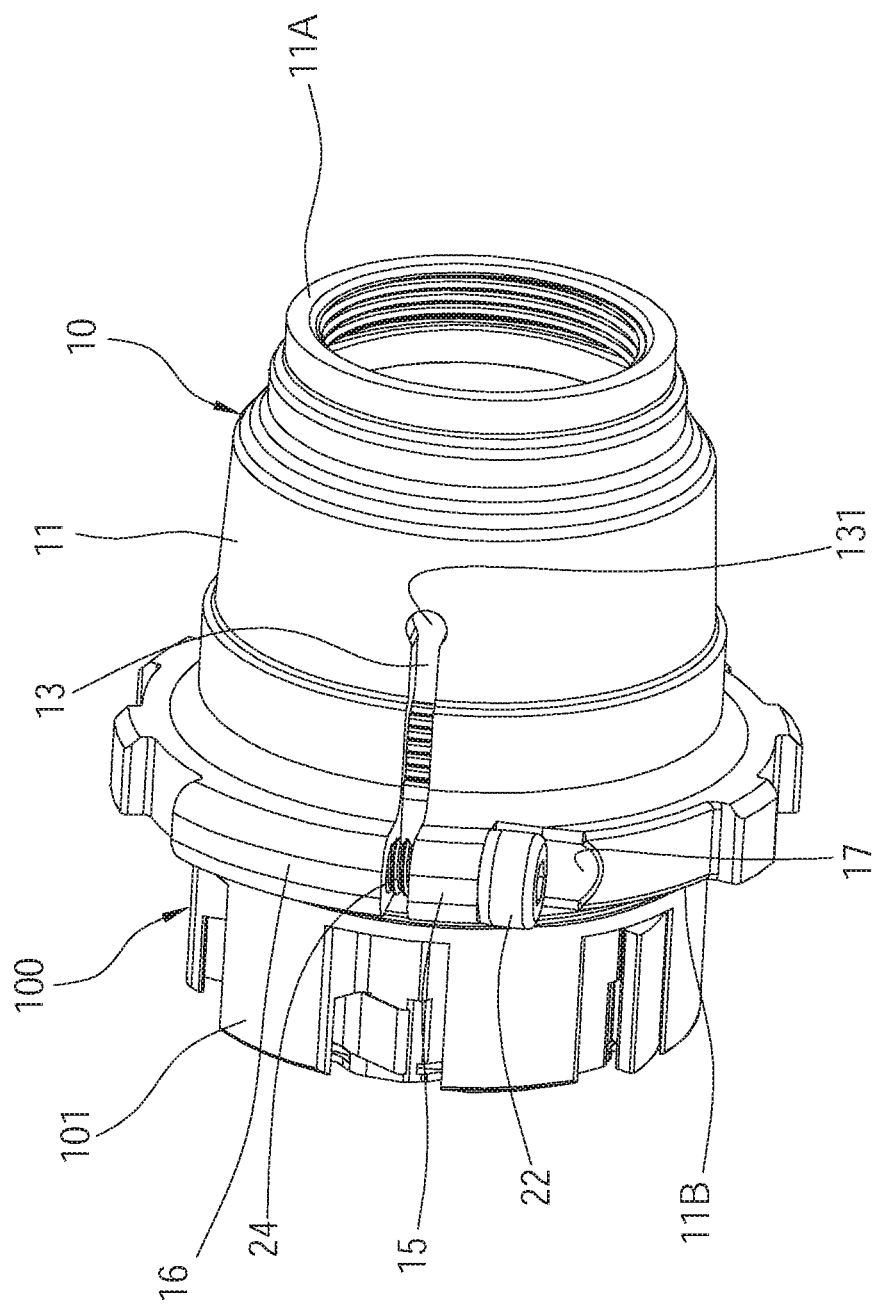
FIG. 14 is a perspective view of the connecting member of the embodiment of the present disclosure and the freehub body, which are connected.
Figure 15:
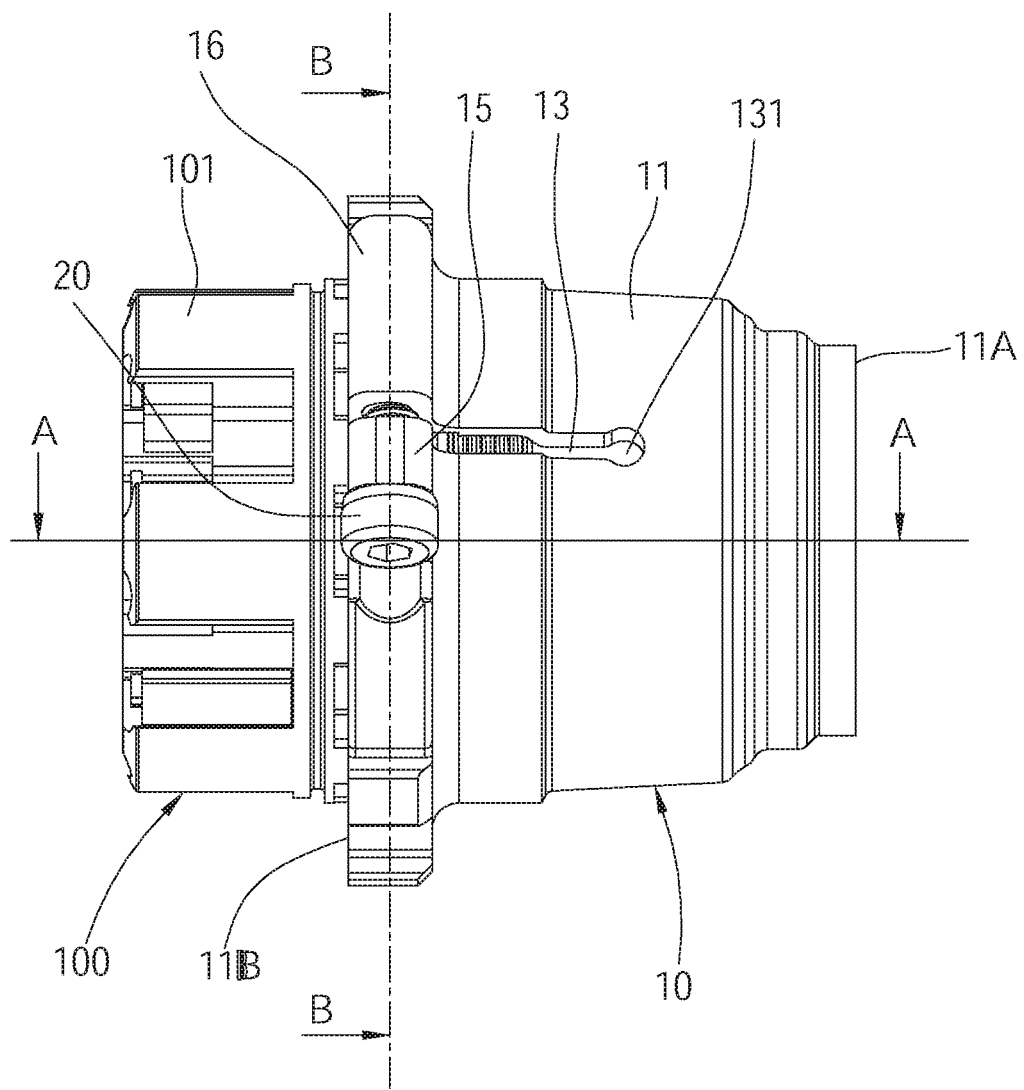
FIG. 15 is a lateral view of FIG. 14.
Figure 16:
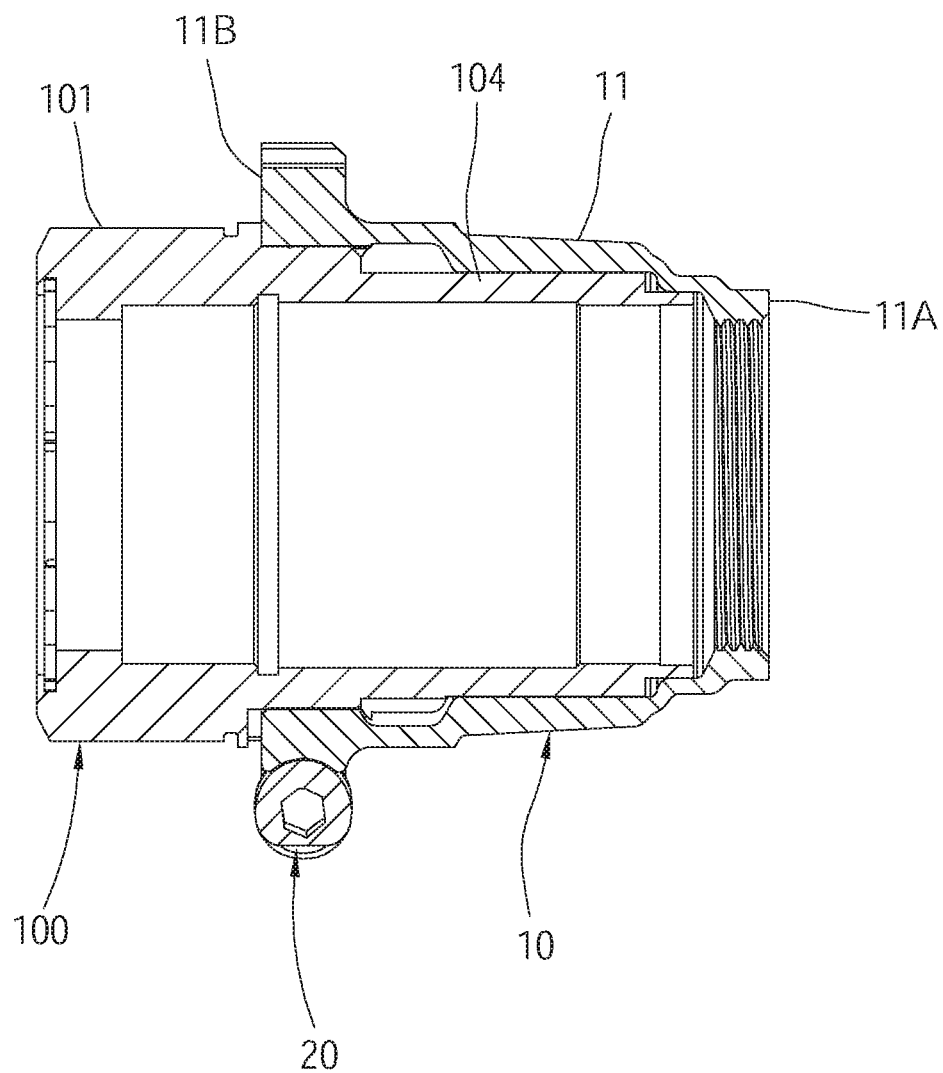
FIG. 16 is a sectional view along the A-A line in FIG. 15.
Figure 17:
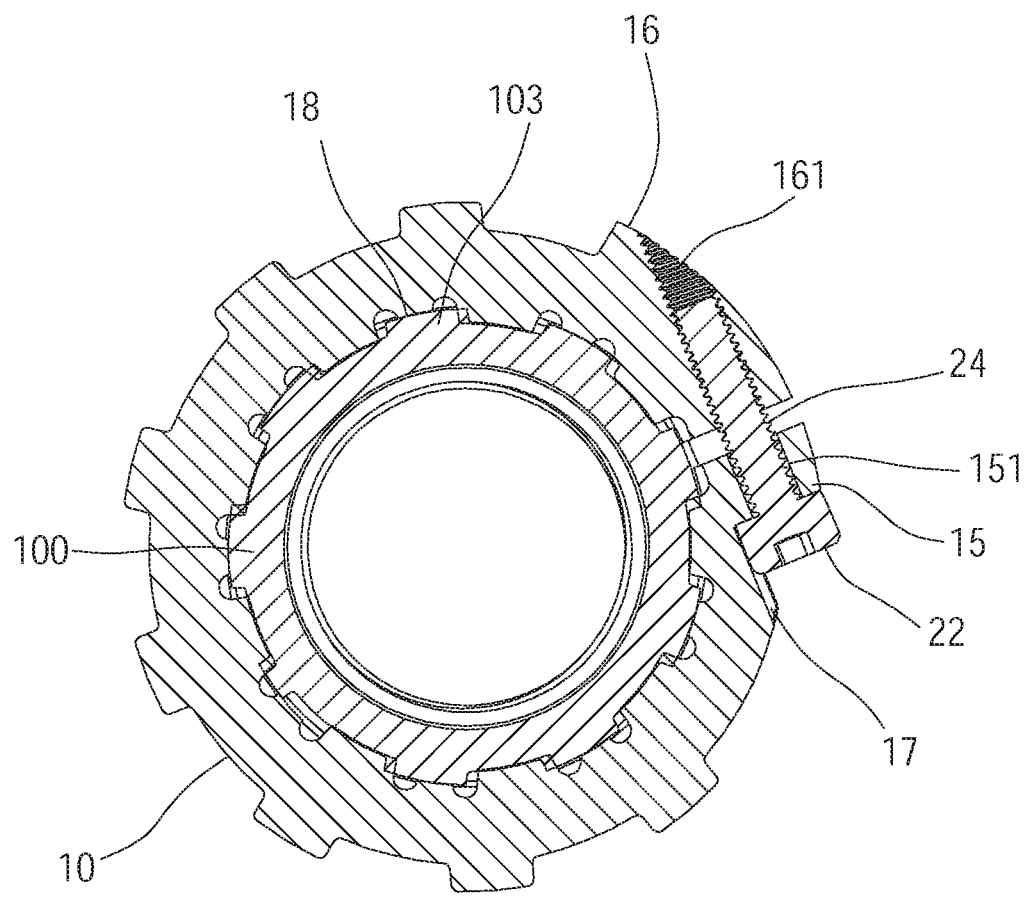
FIG. 17 is a sectional view along the B-B line in FIG. 15.

The structure of each component of the transmission device 1 of the present disclosure is well described above, while the assembly method with the above structures is specified as follows. When starting to assemble the transmission device 1, a user can first fit the body portion 11 of the connecting member 10 around the peripheral part 102 of the freehub body 100 as shown in FIG. 13 to form an assembly status as shown in FIG. 14 to FIG. 16. In such status, the joint part 101 of the freehub body 100 (i.e., the rear wheel of the bicycle, which is not shown) is closer to the second end 11B of the connecting member 10 than the first end 11A. A part of inner wall of the connecting member 10 is in contact with the outer surface of the base seat 104 of the freehub body 100, so that the freehub body 100 can support the connecting member 10. In addition, the convex keys 103 of the freehub body 100 fit in the corresponding concave grooves 18 on the inner wall of the connecting member 10 as illustrated in FIG. 17. Next, the user exerts a force on the first and the second connecting seats 15, 16 to pull them closer by tightening the fastener 20, so that the connecting member 10 pinches the freehub body 100 and is fixed to the freehub body 100. Furthermore, through the design of the curved cut groove terminal with the opening 131 which has the diameter R that is greater than the width L of the cut groove, during fastening, the fastener 20 forces the first and the second connecting seats 15, 16 closer together, and the stress applied to the cut groove 13 terminal during fastening on the two sides of the cut groove 13 will be effectively dispersed. Thus, the cut groove 13 terminal will not crack due to the stress, which ensures the structural reliability of the transmission device 1. Additionally, through the design of the recess 17 of the connecting member 10 adjacent to the first connecting seat 15, when the fastener 20 screws towards the second connecting seat 16, there is no interference between the head 22 and the connecting member 10, which effectively improves the assembly efficiency and speed of the transmission device 1 and ensures stability during assembly. In this way, when the connecting member 10 turns, the turning force generated by the connecting member can be transmitted through contact areas where the concave grooves 18 and the convex keys 103 are engaged, and thus the connecting member 10 can drive the freehub body 100 to turn synchronously.

Figure 18:
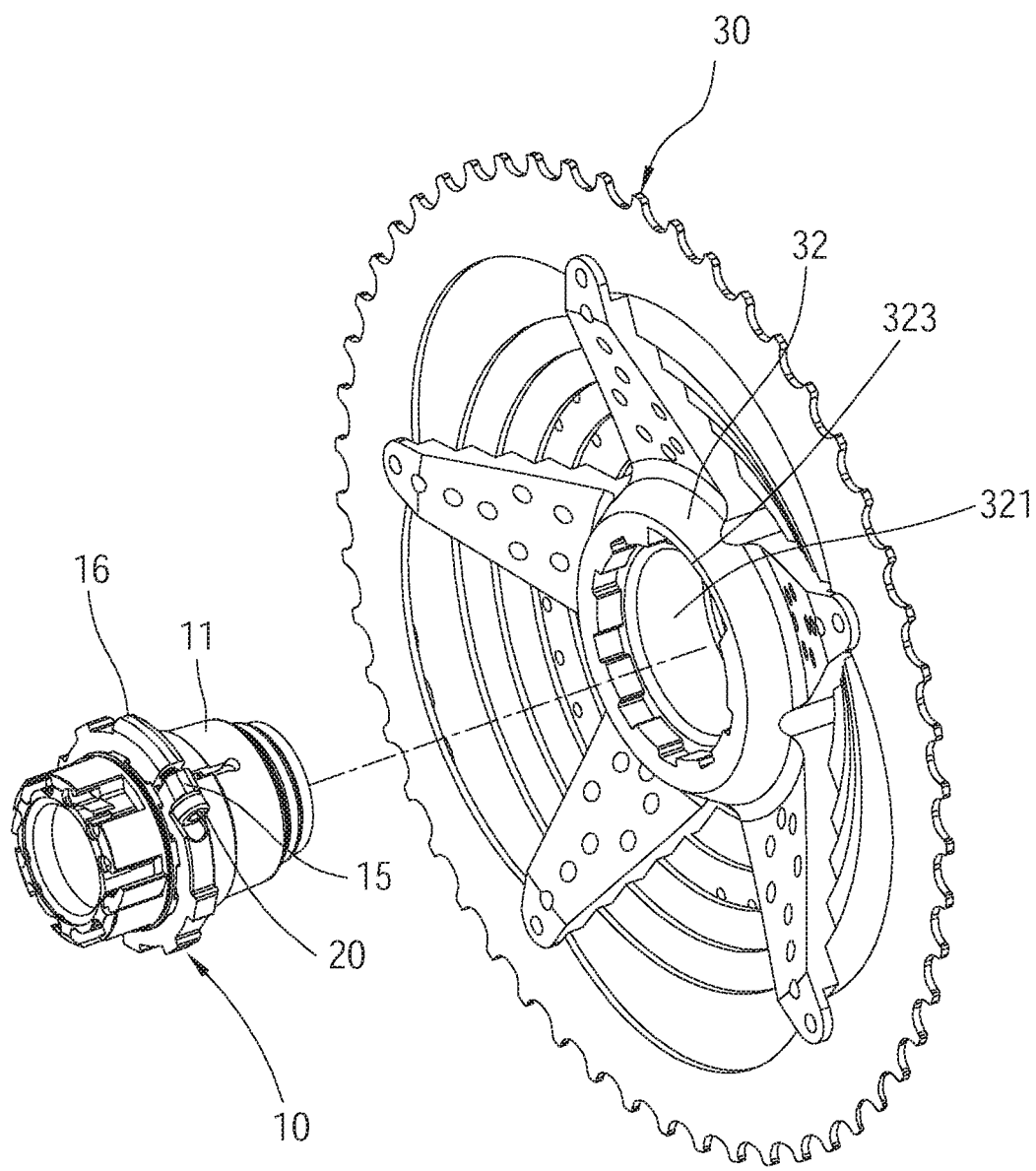
FIG. 18 is a perspective view of the structure in FIG. 14 and the cogset assembly, which have not been connected yet.
Figure 19:
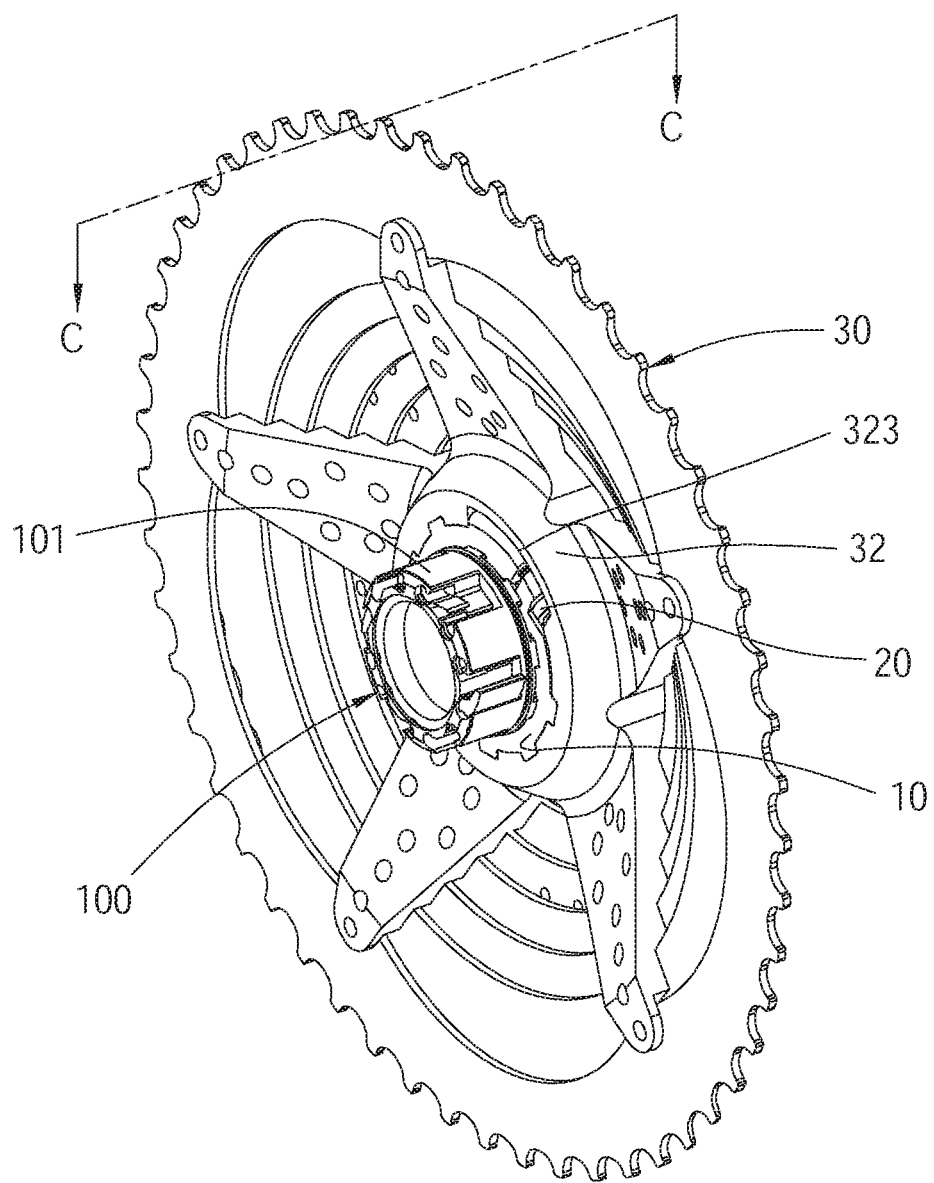
FIG. 19 is a perspective view of the structure in FIG. 14 and the cogset assembly, which are connected.
Figure 20:
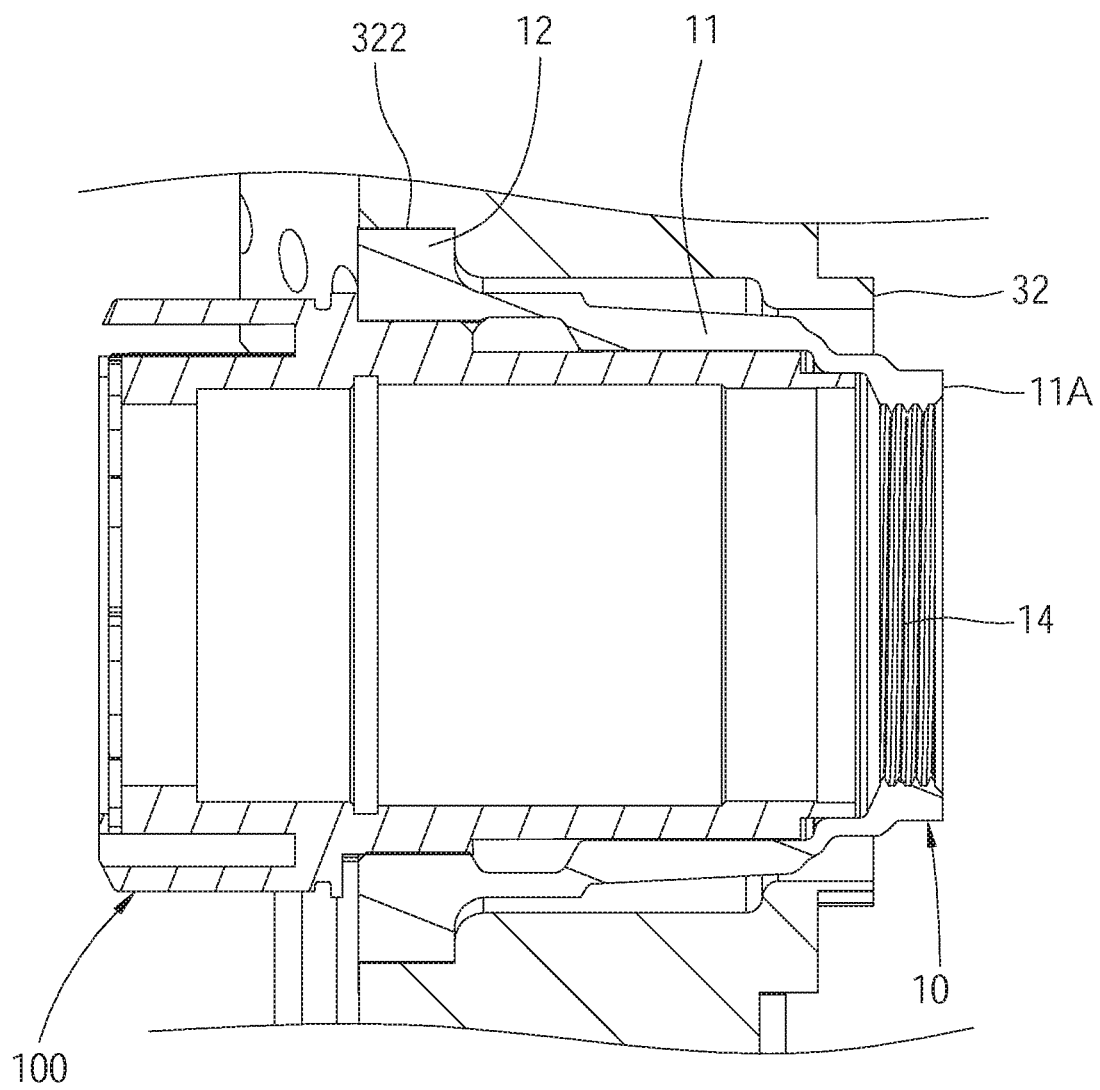
FIG. 20 is a sectional view along the C-C line in FIG. 19.
Figure 21:
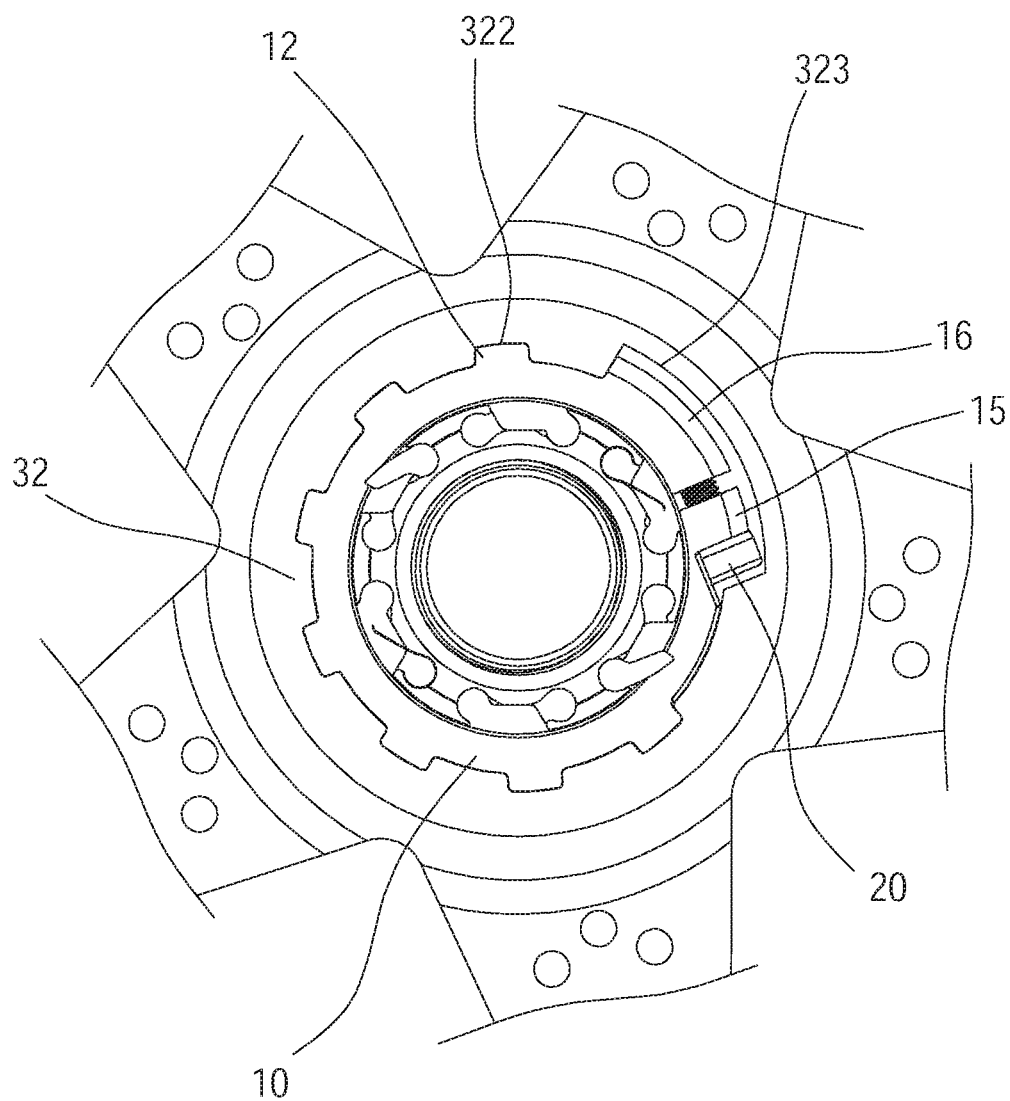
FIG. 21 is a rear view of FIG. 19.

After finishing the abovementioned assembly, the cogset assembly 30 can be installed on the connecting member 10 as depicted in FIG. 18. More specifically, the first socket hole 321 of the cogset seat 32 fits around the body portion 11 of the connecting member 10 to form an assembly status as shown in FIG. 19 and FIG. 20, wherein the cogset seat 32 and the sprockets 34A to 34I are coaxially provided on the exterior of the connecting member 10. The first end 11A of the connecting member 10, which has the internal thread section 14, will slightly protrude from the cogset seat 32. At the same time, the connection keys 12 of the connecting member 10 are engaged with the corresponding connection grooves 322 of the cogset seat 32 as shown in FIG. 21, while the first connecting seat 15, the second connecting seat 16 as well as the fastener 20 of the connecting member 10 are located in the receiving groove 323. In such way, when the cogset assembly 30 turns, the turning force generated by the cogset assembly 30 can be transmitted through contact areas where the connection grooves 322 and the connection keys 12 are engaged, and thus the cogset assembly 30 can drive the connecting member 10 to turn synchronously, and furthermore the connecting member 10 can drive the freehub body 100 to turn as well.

In addition, through the design of the receiving groove 323 accommodating the first connecting seat 15, the second connecting seat 16, and the fastener 20, when the cogset assembly 30 turns, the cogset seat 32 will not be in contact with the fastener 20 installed on the first connecting seat 15 and the second connecting seat 16, and therefore avoids that the fastener 20 comes loose due to any physical contact, which improves the reliability and safety of the assembled transmission device 1. Moreover, since the first connecting seat 15, the second connecting seat 16, and the fastener 20 can only fit in the receiving groove 323 of the cogset seat 32, rather than the connection grooves 322 of the cogset seat 32, cogset assembly 30 can be limited to engage with connecting member 10 at a predetermined installation angle, which achieves a foolproof installation effect during assembly, and thus the possibility of incorrectly installing the connecting member 10 during assembly can be significantly reduced. In this way, the assembly speed of the cogset assembly 30 can increase, and the correctness of assembling the cogset assembly 30 is ensured as well.

Figure 22:
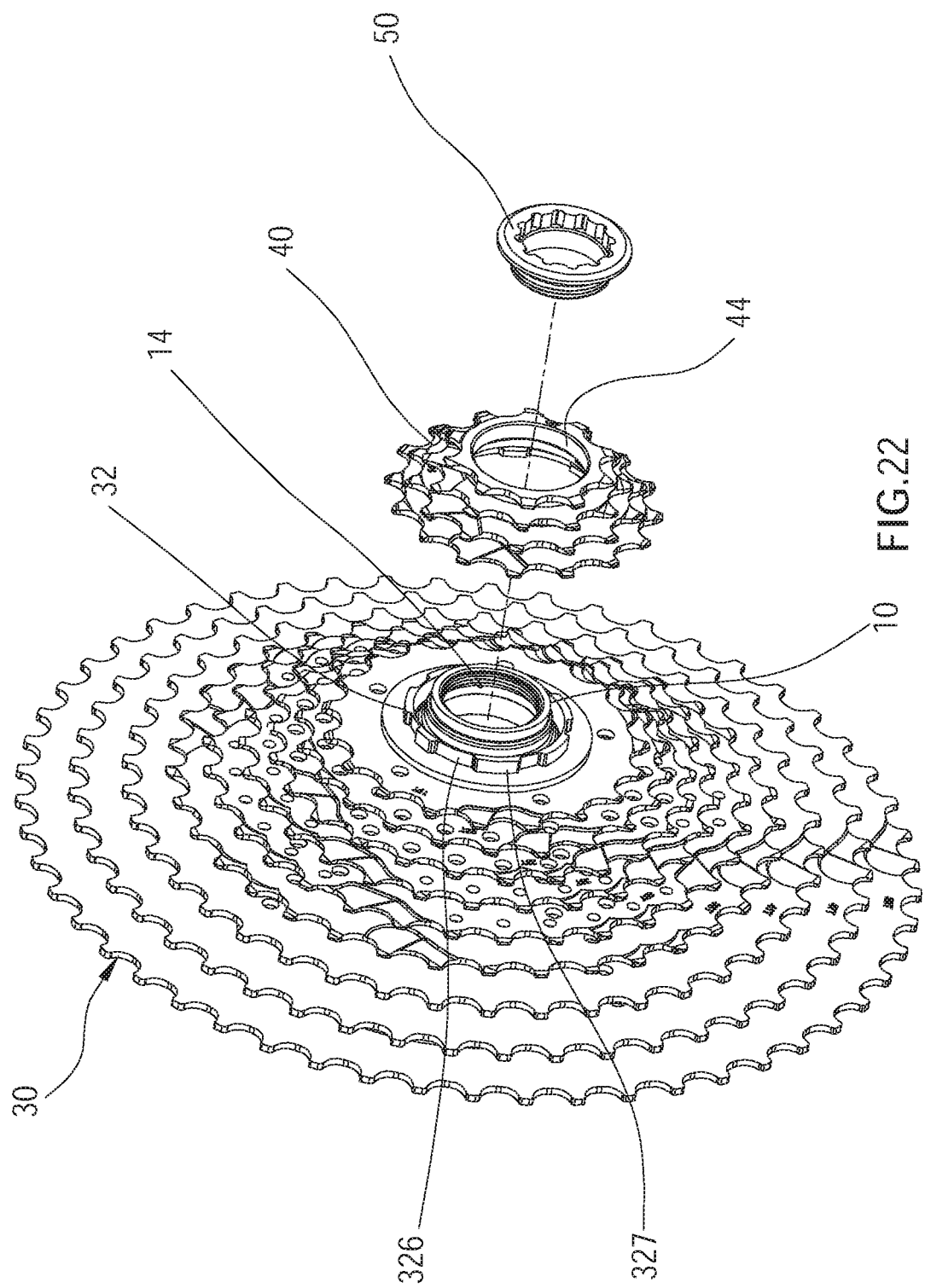
FIG. 22 is a perspective view of the structure in FIG. 19, the affiliated sprocket, and the locking ring, which have not been connected yet.
Figure 23:
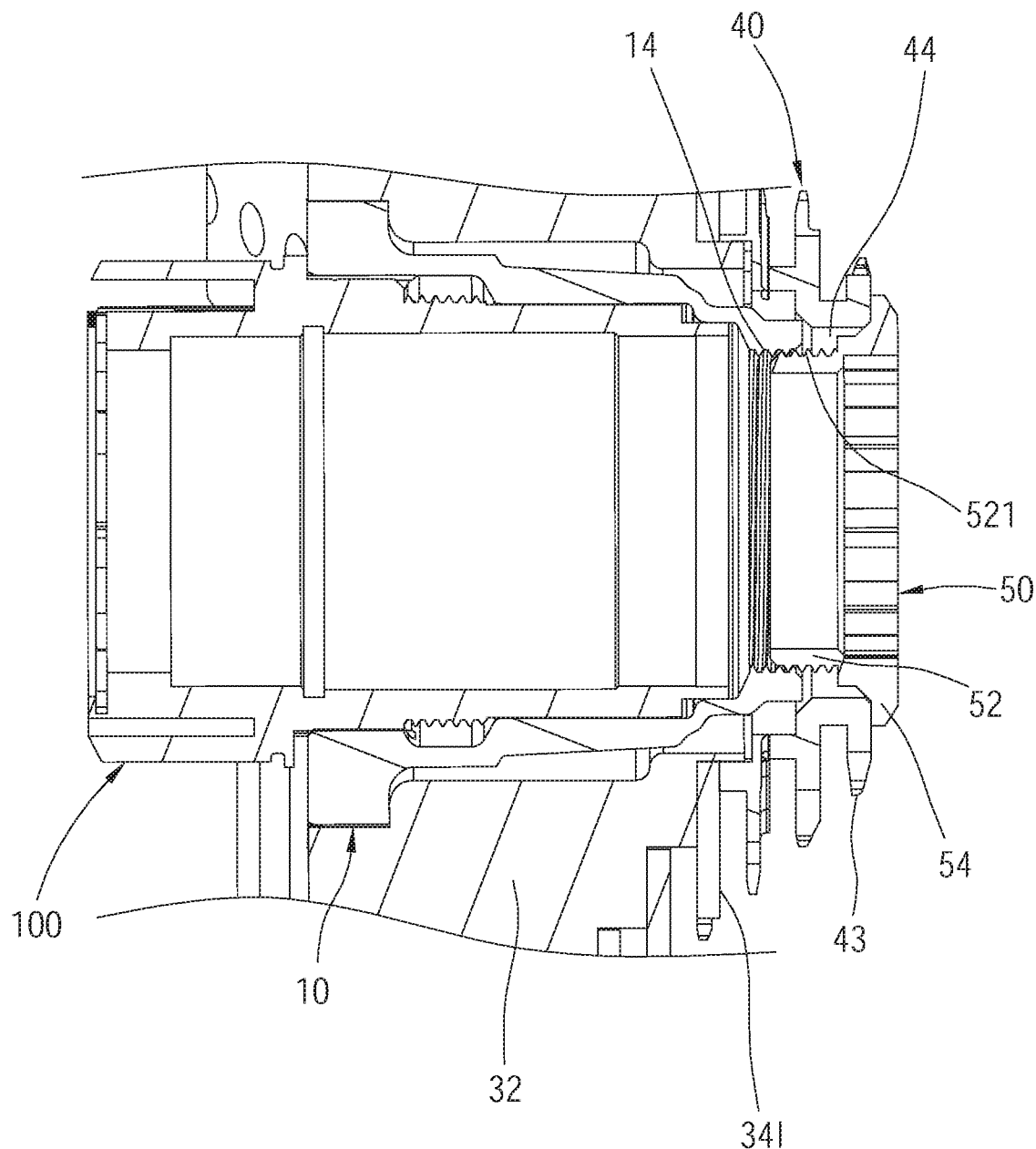
FIG. 23 is a sectional view along the D-D line in FIG. 2.
Figure 24:
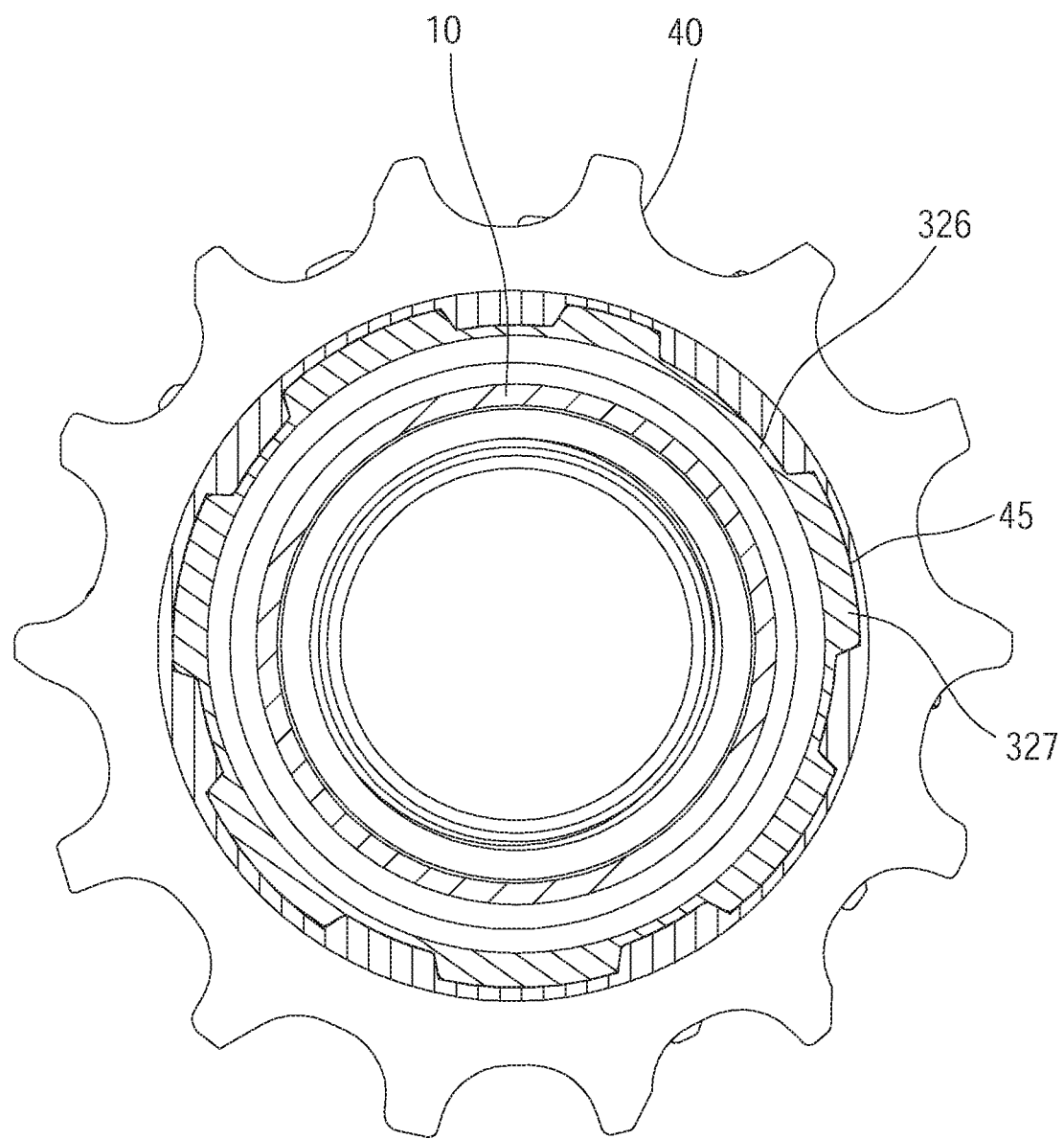
FIG. 24 is a sectional view along the E-E line in FIG. 2.

After completing the assembly of the connecting member 10 and the cogset assembly 30, the user can assemble the affiliated sprocket 40 and the locking ring 50 in sequence as shown in FIG. 22 to form the structure as illustrated in FIG. 1, FIG. 2, and FIG. 23 so as to finishing the assembly of the transmission device 1. More specifically, during this assembly process, first the second socket hole 44 of the affiliated sprocket 40 fits around the accessory mounting seat 326 of the cogset seat 32, wherein the accessory mounting keys 327 of the accessory mounting seat 326 are respectively engaged with the corresponding accessory mounting grooves 45 of the affiliated sprocket 40 as shown in FIG. 24. Next, the main body segment 52 of the locking ring 50 is passed through the second socket hole 44 of the affiliated sprocket 40, and the locking ring 50 is screwed to connect the external thread section 521 with the internal thread section 14 on the inner wall of the connecting member 10, which makes the main body segment 52 of the locking ring 50 enter the connecting member 10. Furthermore, the flange segment 54 of the locking ring 50 presses on the chain teeth portion 43 of the affiliated sprocket 40, and then the affiliated sprocket 40 presses on the sprocket 34I of the cogset assembly 30 thereby firmly pressing the sprocket 34I and fixing the cogset assembly 30 on the connecting member 10, finishing the assembly of the transmission device 1. Additionally, the cogset assembly 30 engages the connecting member 10 through the combination of the external thread section 521 of the locking ring 50 and the internal thread section 14 of the connecting member 10. The threads on the locking ring 50 and the connecting member 10 are bigger and deeper than threads of general bolts, so that the cogset assembly 30 is effectively fixed to the connecting member 10, which prevents them from coming loose due to long-term vibration.

In this way, when the affiliated sprocket 40 turns, the turning force generated by the affiliated sprocket 40 can be transmitted through contact areas where the accessory mounting grooves 45 and the accessory mounting keys 327 are engaged, and thus the cogset assembly 40 can drive the cogset seat 32 to turn synchronously. At the same time, the cogset seat 32 drives the connecting member 10 to turn synchronously, which makes the connecting member 10 drive the freehub body 100 turn synchronously as well.

From the above, with the design of each structure of the transmission device 1, during assembling the transmission device 1, the user only needs to fit the connecting member 10 first, and then screw the fastener 20 firmly, fit the cogset assembly 30, fit the affiliated sprocket 40, and screw the locking ring 50 firmly in sequence to finish the assembly. The assembly process is simple and fast. Furthermore, with the abovementioned structures, the force is not transmitted through threads so as to prevent the screw threads from being stripped, which ensures the safety of users when riding.

Figure 25:
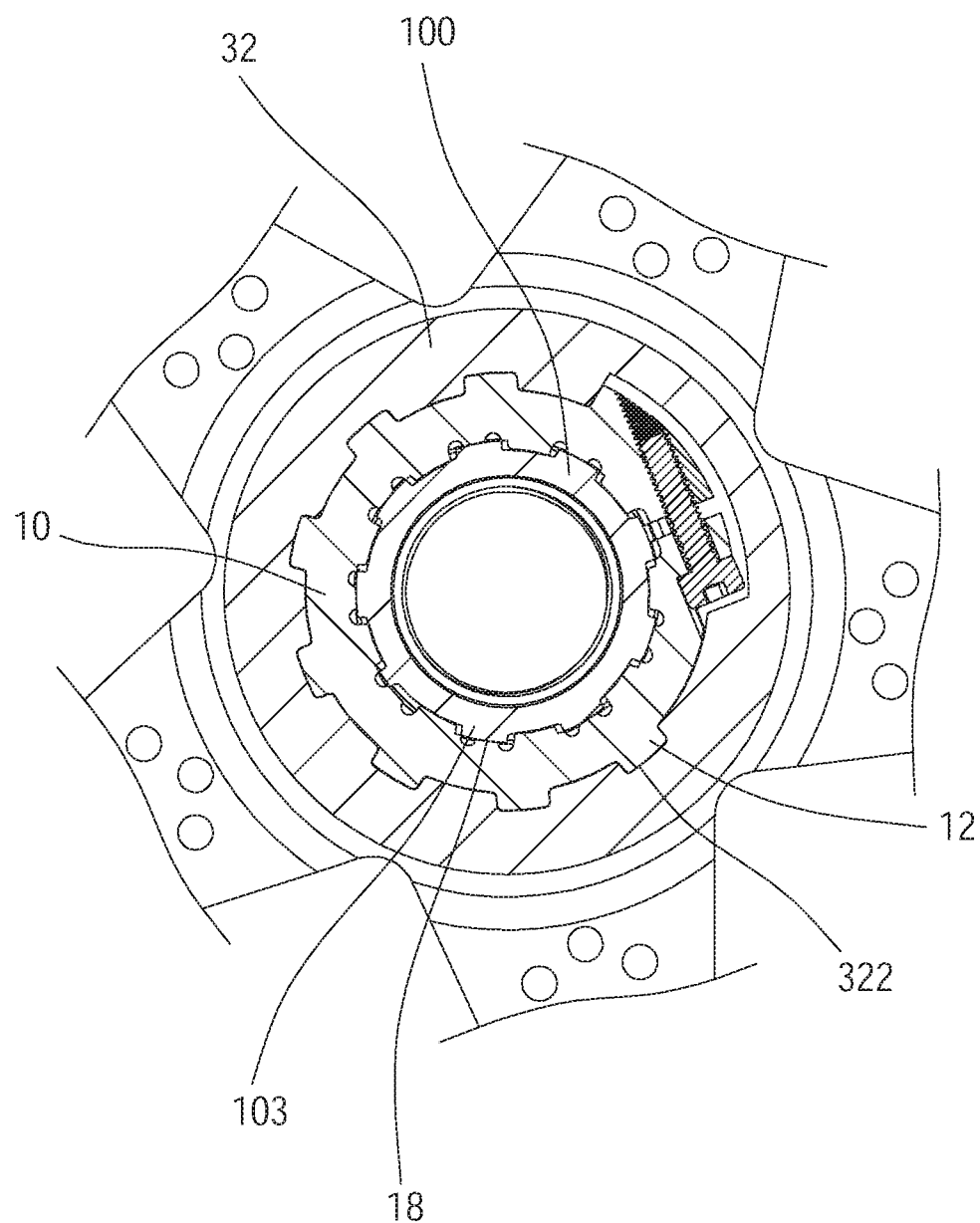
FIG. 25 is a sectional view along the F-F line in FIG. 2.

Moreover, with the structural designs of the connecting member 10 and the cogset seat 32 of the cogset assembly 30 of transmission device 1, referring to FIG. 25, the convex keys 103 of the freehub body 100 and the corresponding concave grooves 18 of the connecting member 10 as well as the connection keys 12 of the connecting member 10 and their corresponding connection grooves 322 of the cogset seat 32 are all located in the same radial plane after the transmission device is assembled. Thus, when the sprockets 34A to 34I are turning, the turning force can be transmitted through the cogset seat 32 more directly to the connecting member 10 and the freehub body 100 in sequence instead of being transmitted through other structures. In this way, the loss of force is substantially reduced during transmission, which ensures the force transmission efficiency of the transmission device 1.

Additionally, with the design of the detachable and replaceable affiliated sprocket 40, users can replace the affiliated sprocket 40 with another affiliated sprocket with a different number of rings or chain teeth according to usage requirements, which can meet the needs of customized gear shift. In other embodiments, the affiliated sprocket 40 can be omitted, while another corresponding locking ring can be provided to press the sprocket 34I or the cogset seat 32 directly, which also achieves the purpose of fixing the cogset assembly 30 to the connecting member 10.

The force transmission pathway of the transmission device of the present disclosure does not use through threads, which avoids the risk of stripped screw threads. Moreover, the structure does not come loose easily, and provides a secure and strong connection. Furthermore, the transmission device of the present disclosure is also easy to detach and assemble, which makes the subsequent maintenance and repair convenient. It must be noted that the embodiments described above are only preferred embodiments of the present disclosure. All equivalent structures which employ the concepts disclosed in this specification and the appended claims should fall within the scope of the present disclosure.

What is claimed is:

1. A bicycle transmission device for connecting to a freehub body of a bicycle, wherein the freehub body is coaxially connected to a rear wheel of the bicycle; the freehub body having a peripheral part and a plurality of convex keys extending along a radial direction of the peripheral part; the bicycle transmission device comprising:
   a connecting member including a body portion, a plurality of connection keys, a cut groove, a first connecting seat, and a second connecting seat, wherein the body portion is cylindrical and has a first end and a second end; the plurality of connection keys protrudes from an outer periphery of the body portion; the cut groove passes through an inner wall and an outer wall of the body portion, and extends from the second end to the first end; the first connecting seat and the second connecting seat are respectively located on two sides of the cut groove; and the connecting member has a plurality of concave grooves formed on the inner wall of the body portion, the plurality of concave grooves of the connecting member corresponds to the plurality of convex keys of the freehub body; and
   a fastener in the form of a bolt for coupling the first connecting seat with the second connecting seat and for exerting a force on the first connecting seat and the second connecting seat;
   wherein the body portion of the connecting member is adapted to fit on the freehub body and to connect the plurality of concave grooves of the connecting member with the plurality of convex keys of the freehub body; wherein the force exerted by the fastener on the first connecting seat and the second connecting seat allows the connecting member to be fixed to the freehub body and to install the bicycle transmission device on the freehub body; and
   a cogset assembly which includes a cogset seat and at least two sprockets, the cogset seat has a first socket hole provided to fit around the connecting member, the cogset seat further has a plurality of connection grooves correspondingly connected to the plurality of connection keys of the connecting member; wherein the at least two sprockets have a different number of chain teeth respectively, and wherein the at least two sprockets are coaxially connected to the cogset seat; and
   wherein the cogset seat further has a receiving groove adapted to receive the first connecting seat, the second connecting seat, and the fastener of the connecting member.

2. The bicycle transmission device of claim 1, wherein the connecting member has an internal thread section on the inner wall at the first end of the body portion; and the bicycle transmission device further comprises an affiliated sprocket and a locking ring, wherein the affiliated sprocket comprises a chain teeth portion consisting of a predetermined number of chain teeth, which is provided on an outer periphery in a radial direction of the affiliated sprocket; the affiliated sprocket has a second socket hole on an inner periphery in the radial direction of the affiliated sprocket for fitting around the connecting member; the locking ring comprises a main body segment and a flange segment, wherein an outer diameter of the flange segment is greater than an outer diameter of the main body segment; the main body segment has an external thread section correspondingly engaged with the internal thread section so that the flange segment presses on the affiliated sprocket, and then the affiliated sprocket presses one of the at least two sprockets of the cogset assembly.

3. The bicycle transmission device of claim 2, wherein the cogset seat comprises an accessory mounting seat protruding from the first end close to a periphery of the first socket hole; the accessory mounting seat comprises at least one accessory mounting key protruding in a radial direction of the accessory mounting seat; and the affiliated sprocket has at least one accessory mounting groove formed on an inner wall of the second socket hole and the at least one accessory mounting groove corresponds to the at least one accessory mounting key.

4. The bicycle transmission device of claim 1, wherein the first connecting seat has a perforation, and the second connecting seat has a screw hole coaxially corresponding to the perforation so that, during assembly, the fastener passes through the perforation, engages the screw hole, exerts a force on the first connecting seat and the second connecting seat, and pulls the first connecting seat and the second connecting seat close to each other.

5. The bicycle transmission device of claim 1, wherein the plurality of connection keys of the connecting member and the plurality of concave grooves are located in a same radial plane.

6. The bicycle transmission device of claim 1, wherein a terminal in an axial direction of the cut groove of the connecting member has a curved opening, and wherein a diameter of the curved opening is greater than a width of the cut groove.

7. The bicycle transmission device of claim 1, wherein the cogset seat comprises a plurality of mounting arms which are radially arranged around the first socket hole; each of the mounting arms has at least one stage in an axial direction, which correspondingly forms at least two mounting surfaces arranged along the axial direction, and wherein the at least two sprockets engage the at least two mounting surfaces respectively.

8. The bicycle transmission device of claim 4, wherein the body portion of the connecting member has a recess recessed into the second end at a position adjacent to the first connecting seat; wherein the fastener comprises a body and a head, the body is adapted to pass through the perforation and to engage the screw hole; wherein an outer diameter of the head is greater than an outer diameter of the body; and wherein the head presses on the first connecting seat and is located in the recess.

\* \* \* \* \*